(12) United States Patent
Suzuki et al.

(10) Patent No.: US 11,167,364 B2
(45) Date of Patent: Nov. 9, 2021

(54) JET SOLDER BATH AND JET SOLDERING APPARATUS

(71) Applicant: Senju Metal Industry Co., Ltd., Tokyo (JP)

(72) Inventors: Ryoichi Suzuki, Tokyo (JP); Yasuji Kawashima, Osaka (JP); Tetuya Okuno, Saitama (JP); Shigeo Komine, Tokyo (JP); Takashi Sugihara, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 278 days.

(21) Appl. No.: 16/051,755

(22) Filed: Aug. 1, 2018

(65) Prior Publication Data

US 2019/0039159 A1 Feb. 7, 2019

(30) Foreign Application Priority Data

Aug. 4, 2017 (JP) .............................. JP2017-151746

(51) Int. Cl.
*B23K 3/06* (2006.01)
*B23K 1/08* (2006.01)
*B23K 1/20* (2006.01)
*B23K 3/08* (2006.01)
*B23K 1/00* (2006.01)
(Continued)

(52) U.S. Cl.
CPC .......... *B23K 3/0653* (2013.01); *B23K 1/0016* (2013.01); *B23K 1/085* (2013.01); *B23K 1/203* (2013.01); *B23K 3/082* (2013.01); *B23K 3/085* (2013.01); *B23K 2101/36* (2018.08); *B23K 2101/42* (2018.08)

(58) Field of Classification Search
CPC ....................................................... B23K 3/06
See application file for complete search history.

(56) References Cited

U.S. PATENT DOCUMENTS 4,540,114 A * 9/1985 Pachschwoll ........ B23K 3/0653
    228/37
5,156,324 A * 10/1992 Hueste ................... B23K 1/085
    228/180.1

(Continued)

FOREIGN PATENT DOCUMENTS

CN     1753752 A     3/2006
JP     63281768 A     11/1988
(Continued)

*Primary Examiner* — Devang R Patel
(74) *Attorney, Agent, or Firm* — The Webb Law Firm

(57) ABSTRACT

Provided are a jet solder bath and a jet soldering apparatus using the jet solder bath. The jet solder bath contains first and second jet nozzles which inject molten solder by first and second pumps and a bridge member arranged between the first and second jet nozzles. The bridge member includes a guide portion that guides at least one of flows of the molten solder injected from the first jet nozzle and flowing on the downstream side of the first jet nozzle and of the molten solder injected from the second jet nozzle and flowing on an upstream side of the second jet nozzle, and side members which controls the flow of the molten solder, the side members being arranged near opposite ends of the guide portion across a direction that is perpendicular to the carrying direction of the substrate.

13 Claims, 14 Drawing Sheets

(51) Int. Cl.
*B23K 101/42* (2006.01)
*B23K 101/36* (2006.01)

(56) References Cited

U.S. PATENT DOCUMENTS

| | | | | |
|---|---|---|---|---|
| 5,240,169 | A * | 8/1993 | Gileta | B23K 1/085 228/180.1 |
| 5,409,159 | A * | 4/1995 | Connors | B23K 3/0653 228/219 |
| 5,411,197 | A * | 5/1995 | Nakamura | B23K 3/0653 228/34 |
| 5,769,305 | A * | 6/1998 | Takeda | B23K 3/0653 228/37 |
| 5,772,101 | A * | 6/1998 | Nishimura | B23K 3/0653 228/260 |
| 6,513,702 | B2 * | 2/2003 | Mawatari | B23K 3/0653 228/260 |
| 6,732,309 | B1 * | 5/2004 | Toutounchi | G01R 31/318516 714/725 |
| 6,742,693 | B2 * | 6/2004 | Wang | B23K 3/0646 228/260 |
| 2001/0020637 | A1 * | 9/2001 | Zen | B23K 3/0653 228/260 |
| 2003/0116607 | A1 | 6/2003 | Wang et al. | |
| 2006/0191976 | A1 | 8/2006 | Kaneko | |
| 2009/0236402 | A1 * | 9/2009 | Willenegger | B23K 1/08 228/45 |
| 2010/0065610 | A1 * | 3/2010 | Szymanowski | B23K 1/085 228/37 |
| 2011/0247202 | A1 * | 10/2011 | Inoue | G01R 33/07 29/705 |
| 2017/0072492 | A1 | 3/2017 | Hashimoto et al. | |

FOREIGN PATENT DOCUMENTS

| | | | |
|---|---|---|---|
| JP | 2001251047 | A | 9/2001 |
| JP | 2003236655 | A | 8/2003 |
| JP | 2004268092 | A * | 9/2004 |
| JP | 2005177845 | A * | 7/2005 |
| JP | 2005177845 | A | 7/2005 |
| JP | 200693281 | A | 4/2006 |
| JP | 4410490 | B2 | 2/2010 |
| JP | 4729453 | B2 | 7/2011 |
| JP | 201755030 | A | 3/2017 |

\* cited by examiner

JET SOLDER BATH AND JET SOLDERING APPARATUS

CROSS REFERENCE TO RELATED APPLICATION

This application claims priority to Japanese Patent Application No. 2017-151746 filed Aug. 4, 2017, the disclosure of which is hereby incorporated in its entirety by reference.

FIELD OF THE INVENTION

The present invention relates to a jet solder bath including a first jet nozzle for injecting molten solder by a first pump and a second jet nozzle for injecting the molten solder by a second pump, in order to solder electronic components on a substrate, and a jet soldering apparatus using the above jet solder bath.

RELATED ART

A jet soldering apparatus is generally used to solder the electronic components on the substrate. This jet soldering apparatus is provided with solder processing devices such as a preheater, a jet solder bath, a cooler and the like. In the jet solder bath, primary and secondary jet nozzles for injecting upward the molten solder forcedly fed by the separately prepared pumps are arranged in parallel along a carrying direction of the substrate. In addition, a soldering device is provided in which a fluxer for applying a flux to a substrate is arranged in a preceding stage of the preheater.

The primary jet nozzle (also referred to as a "first jet nozzle") for injecting the molten solder by the first pump (also referred to as a "jet injection pump") injects a roughly waved molten solder which has a function to allow the molten solder to easily enter into a through-hole of the substrate and/or sharp corners in a chip component. Only such a roughly waved molten solder is insufficient to a stable attachment of the solder to a portion to be soldered and a solder bridge which is applied and spread over the adjacent electrodes or a pointed solder piece in which an angular solder is applied to a forward end of a lead of an electronic component may be generated. The solder bridge or the pointed solder piece causes electronic equipment into which a substrate is installed to impede its regular functions. In addition, as shown in FIG. 1B, when the molten solder S is insufficient to wetly spread upward within a through-hole H of a substrate 5, adhesive strength of a lead terminal L of an electronic component and the substrate decreases.

On the other hand, the secondary jet nozzle (also referred to as a "second jet nozzle") for injecting the molten solder by the second pump (also referred to as a "jet injection pump") injects a calmingly waved molten solder which melts the solder bridge and/or pointed solder piece generated by the roughly waved molten solder from the primary jet nozzle again to mend a portion to be soldered as good one. In addition, when the molten solder is insufficient to wetly spread the molten solder upward within the through-hole or corners only by the roughly waved molten solder by the primary jet nozzle, the secondary jet nozzle has played its role to wetly spread the molten solder sufficiently upward within the through-hole of the substrate or the like. It is preferable to wetly spread the molten solder upward within the through-hole that as shown in FIG. 1A, the molten solder S gets solid while the molten solder S sufficiently spreads from the bottom to top within the through-hole H.

A melting point of a past Sn—Pb solder is 183 degrees C. which is low. Even when the primary and secondary jet nozzles are separated from each other, the solder has not gotten solid if some temperature of the solder attached to the substrate by the primary jet nozzle falls down, and therefore, no problem has occurred. Even when the solder bridge and/or pointed solder piece has gotten solid, they have been able to be easily melted by contacting them with the molten solder from the secondary jet nozzle to mend the portion to be soldered because the fallen temperature is around a temperature that is slightly less the meting point.

Recently, a lead-free solder has been used instead of Sn—Pb solder. A melting point of the lead-free solder is 220 degrees C. or more which is higher than that of the Sn—Pb solder. Therefore, when using the lead-free solder and it takes time for the substrate to arrive at the secondary jet nozzle after the soldering of the substrate by the primary jet nozzle, the molten solder attached to the substrate by the primary jet nozzle may be easy to be cooled and gotten solid. The solder bridge and/or pointed solder piece generated on the substrate are easy to be gotten solid. The solder within the through-hole may get solid on the way of wetly spreading the molten solder upward. Therefore, even when contacting them with the molten solder injected from secondary jet nozzle, the solder bridge and/or pointed solder piece generated on the substrate and the solder within the through-hole have not been melted completely, so that the solder bridge and/or pointed solder piece may remain and/or it may be insufficient to wetly spread the molten solder upward within a through-hole.

Japanese Patent No. 4410490 discloses a jet soldering apparatus in which the carriage time of the substrate from the primary jet nozzle to the secondary jet nozzle is lessened by bringing the primary and secondary jet nozzles closer to each other. Japanese Patent No. 4729453 discloses a jet soldering apparatus in which the carriage time of the substrate from the primary jet nozzle to the secondary jet nozzle is lessened by combining the primary and secondary jet nozzles into a single unit.

SUMMARY OF THE INVENTION

When bringing the primary and secondary jet nozzles closer to each other or combining the primary and secondary jet nozzles into a single unit, a configuration of a jet solder bath itself is required to be considerably altered and a wave of the molten solder injected from a jet nozzle flows into a wave of the molten solder injected from the other jet nozzle, so that these actions by respective waves may be mutually cancelled. In addition, by bringing the primary and secondary jet nozzles closer to each other or combining the primary and secondary jet nozzles into a single unit, an oxide of the solder may ride on the waves of the molten solder between the nozzles and is adhered to the substrate, thereby causing any solder failure.

This invention addresses such an issue and has an object to provide a jet solder bath and a jet soldering apparatus which inhibit the molten solder injected from the primary jet nozzle and attached to the substrate from being cooled and gotten solid before it contacts the molten solder from the secondary jet nozzle and inhibit an oxide of the solder from riding on the waves of the molten solder while maintaining respective actions of the molten solders injected from the primary and secondary jet nozzles.

To achieve the above object, according to an aspect of the present invention, there is provided with a jet solder bath containing a first jet nozzle which injects molten solder by a first pump, a second jet nozzle which injects the molten solder by a second pump, the second jet nozzle being arranged on a downstream side of the first jet nozzle along a carrying direction of a substrate, and a bridge member arranged between the first and second jet nozzles, wherein the bridge member includes a guide portion that guides at least one of flows of the molten solder injected from the first jet nozzle and flowing to the downstream side of the first jet nozzle and of the molten solder injected from the second jet nozzle and flowing to an upstream side of the second jet nozzle, and side members which controls the flow of the molten solder, the side members being arranged near opposite ends of the guide portion across a direction that is perpendicular to the carrying direction of the substrate.

According to embodiments of the present invention, it is desired to provide a jet solder bath wherein the bridge member extends from a vicinity of an upper end on an upstream end of the second jet nozzle to a vicinity of an upper end on a downstream end of the first jet nozzle.

It is also desired to provide a jet solder bath further containing an attaching portion which attaches the bridge member to the second jet nozzle to change an attachment height of the bridge member from the second jet nozzle.

It is further desired to provide a jet solder bath further containing a rotation portion which rotates the bridge member to the second jet nozzle.

It is additionally desired to provide a jet solder bath wherein the bridge member extends from a vicinity of an upper end on a downstream of the first jet nozzle to a vicinity of an upper end on an upstream end of the second jet nozzle.

It is still further desired to provide a jet solder bath further containing an attaching portion which attaches the bridge member to the first jet nozzle to change an attachment height of the bridge member from the first jet nozzle.

It is still additionally desired to provide a jet solder bath further containing a rotation portion which rotates the bridge member to the first jet nozzle.

It is still further desired to provide a jet solder bath wherein the guide portion has a length along a flowing direction of the molten solder guided in the guide portion, the length being equal to or longer than a distance between the downstream end of the first jet nozzle and the upstream end of the second jet nozzle, and the guide portion contains an opening formed near the first jet nozzle along a direction that is perpendicular to the carrying direction of the substrate.

It is still additionally desired to provide a jet solder bath wherein the guide portion has a length along a flowing direction of the molten solder guided in the guide portion, the length being shorter than a distance between the downstream end of the first jet nozzle and the upstream end of the second jet nozzle.

According to another aspect of the present invention, there is provided with a jet soldering apparatus containing a preheater which previously heats a substrate, any one of the above-mentioned jet solder baths, a cooler which cools the substrate soldered in the jet solder bath, and a control portion which controls operations of the preheater, the jet solder bath and the cooler.

It is also desired to provide a jet soldering apparatus containing a fluxer which applies a flux to a substrate, a preheater which previously heats the substrate to which the flux is applied, any one of the above-mentioned jet solder baths, a cooler which cools the substrate soldered in the jet solder bath, and a control portion which controls operations of the fluxer, the preheater, the jet solder bath and the cooler.

By this invention, it is possible to inhibit the molten solder injected from the first jet nozzle and attached to the substrate from being cooled and gotten solid before it contacts the molten solder from the second jet nozzle or to inhibit an oxide of the solder from riding on the waves of the molten solder unless the first and second jet nozzles are brought closer to each other or are combined in a single unit. Therefore, it is possible to perform good soldering while maintaining respective actions of the molten solders injected from the primary and secondary jet nozzles. For example, it is specifically preferable to apply this invention to a case where a discrete part such as electrolytic capacitor which requires high heat capacity for soldering is joined to a substrate via a through-hole.

Other objects and attainments of the present invention will be become apparent to those skilled in the art upon a reading of the following detailed description when taken in conjunction with the drawings.

DESCRIPTION OF THE PREFERRED EMBODIMENTS

Figure 1A:
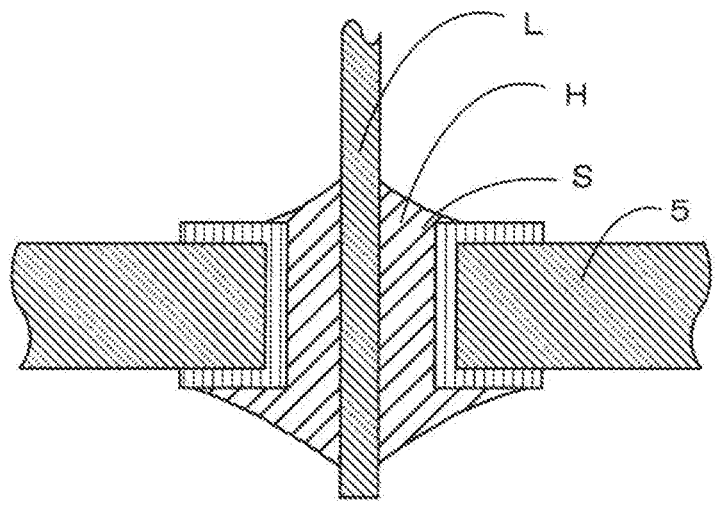
FIG. 1A is a diagram showing a state where molten solder is wetly spread sufficiently upward within the through-hole of the substrate.
Figure 1B:
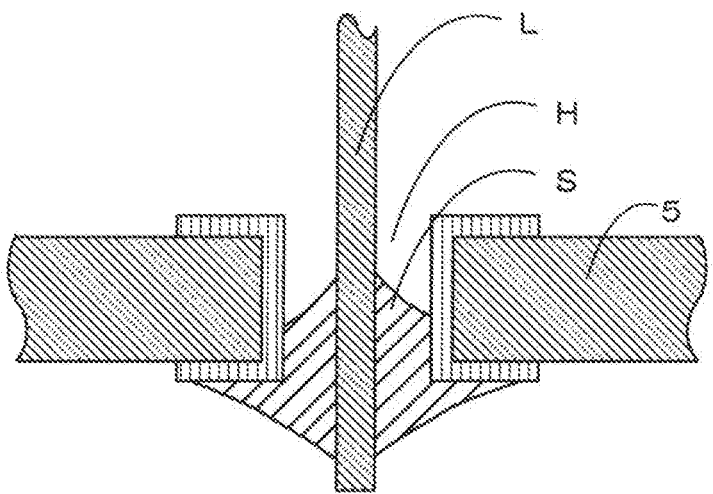
FIG. 1B is a diagram showing a state where molten solder is wetly spread insufficiently upward within the through-hole of the substrate.

The following will describe a jet solder bath and a jet soldering apparatus as preferred embodiments of this invention more in detail with reference to the drawing. In this description, an upstream side indicates aside from which a substrate enters into the jet soldering apparatus along a carrying direction of the substrate, shown by void arrows in the drawings. A downstream side indicates a side to which the substrate is discharged from the jet soldering apparatus. It is estimated that the molten solder is injected from below toward above. In addition, although, in this embodiments, the description will be performed using the embodiments of the solder processing device composed of a fluxer, a preheater, a jet solder bath and a cooler, this invention is not limited to the embodiments. A case where the substrate is carried with a predetermined inclined angle of elevation, for example, about 5 degrees will be illustrated.

[Overall Configuration Example of the Jet Soldering Apparatus 1]

Figure 2:
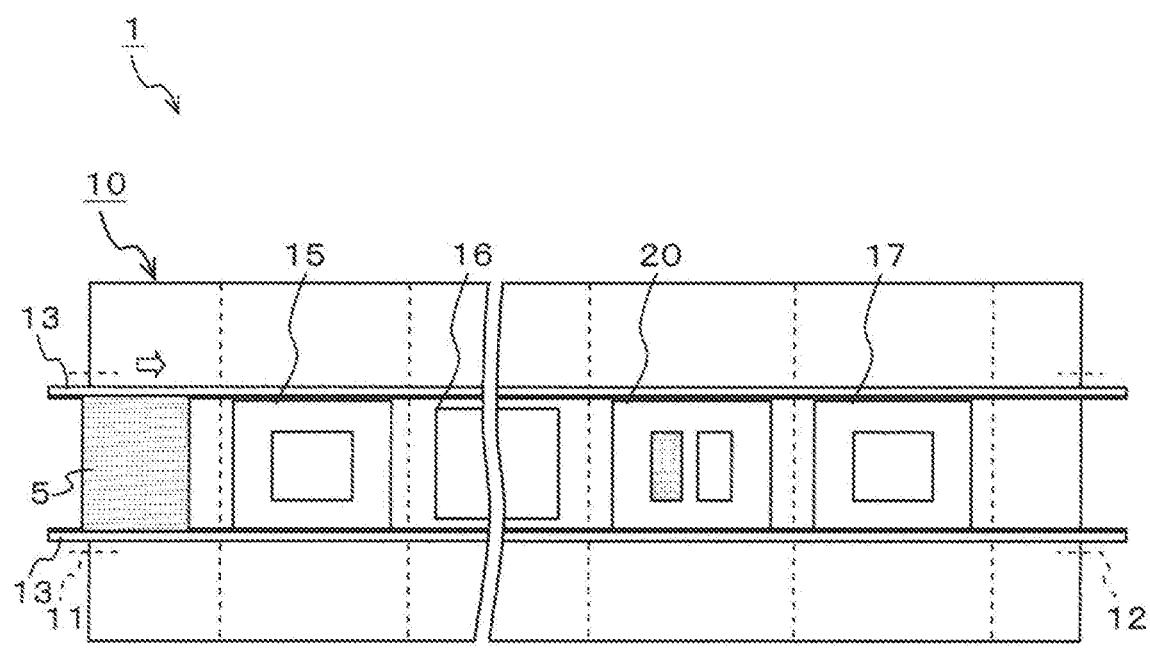
FIG. 2 is a schematic plan view showing a configuration example of a jet soldering apparatus according to an embodiment of the invention.

The jet soldering apparatus 1 shown in FIG. 2 is, for example, a solder processing device that injects molten solder to the substrate 5 which has mounted electronic components to solder the substrate 5 and is provided with a main body 10 and transfer rails 13 on which the substrate 5 is carried toward the void arrow direction shown in FIG. 2. The main body is a casing which has on the sides a carry-in port 11 to which the substrate is carried and a carry-out port 12 from which the substrate is discharged. As described above, a side of the carry-in port 11 is an upstream side.

The main body 10 is provided with the fluxer 15 which applies the flux to the substrate 5, the preheater 16 which previously heats the substrate to which the flus has been applied, the jet solder bath 20 which injects the molten solder and contacts it to the substrate and a cooler 17 which cools the soldered substrate, in this order from the upstream side along the transfer rails 13. The transfer rails 13 extend to the carry-out port 12 and when the substrate is discharged from the carry-out port 12, the solder processing is completed in this jet soldering apparatus 1. The jet soldering apparatus 1 is also provided with a control portion 70, shown in FIG. 3, which controls an operation of each portion.

The fluxer 15 applies the flux to the carried substrate 5. The flux contains a solvent, an activator and the like. As the fluxer, plural applying devices may be provided. In this case, they can be used for each species of the solder, each kind of substrate 5, or each sort of flux.

The preheater 16 previously heats the substrate 5 uniformly up to a predetermined temperature. Heating the substrate 5 like this allows the solder to be easily attached to a desired portion of the substrate 5. In the preheater 16, for example, a halogen heater is used. The halogen heater can heat the substrate rapidly up to a set temperature. Blowing gas (hot air) heated by the heater to the substrate by a fan enables the substrate 5 to be heated. A far-infrared ray panel heater or the like may be also used therefor.

The jet solder bath 20 injects the molten solder S which has been forcedly fed by a pump, not shown, through a duct, not shown, to the substrate 5 to form the solder on a desired portion of the substrate 5. In the jet solder bath 20, a heater, not shown, heats the molten solder up to around 250 degrees C. A configuration of the jet solder bath 20 will be described later more in detail.

The cooler 17 has a cooling fan, not shown, which cools the substrate 5 soldered in the jet solder bath 20. It is to be noted that although a control of the cooling fan is carried out by only ON and OFF in these embodiments, an operator may optionally set a period of cooling time to meet a product. Further, any thermal management using a chiller or the like may be performed to chill the substrate 5 to a desired temperature. In this case, the operator can also optionally set the cooling temperature.

Figure 3:
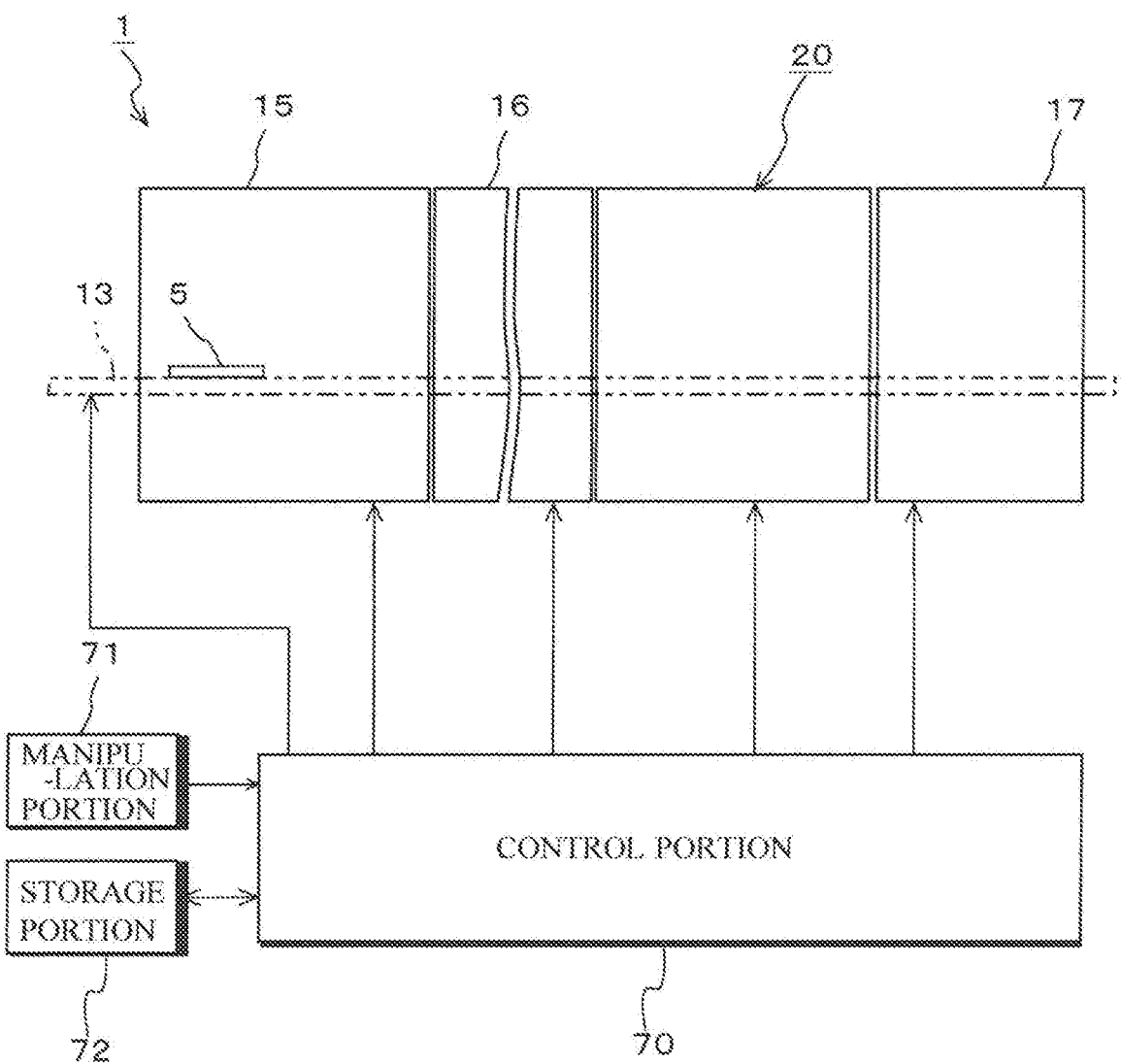
FIG. 3 is a block diagram showing a control system of the jet soldering apparatus.

As shown in FIG. 3, the control portion 70 connects the transfer rails 13, the fluxer 15, the preheater 16, the jet solder bath 20, the cooler 17, a manipulation portion 71 and a storage portion 72. As the manipulation portion 71, a liquid-crystal display or a numeric key is used. When the operator manipulates the manipulation portion 71, the control portion 70 controls a carrying speed of the substrate 5 on the transfer rails 13, carrying timing of the substrate 5, the temperature of the flux which the fluxer has, an amount of the flux to be applied, the temperature of the preheater 16, the temperature of the molten solder S in the jet solder bath 20, an amount and a speed of the molten solder to be injected, ON or OFF operation of the cooling fan, not shown, which the cooler 17 has, and the like. The storage portion 72 stores any information inputted by the manipulation portion 71, any instructions by the control portion 70, uptime of the jet soldering apparatus 1 and the like.

The following will describe the jet solder baths according to respective embodiments of this invention. The above-mentioned jet soldering apparatus 1 may contains any of the respective jet solder baths.

[Configuration Example of Jet Solder Bath 20A as the First Embodiment]

In this embodiment, a case will be described wherein the bridge member, which will be later, extends from a vicinity of an upper end on an upstream end of a secondary jet nozzle 40 (second jet nozzle) to a vicinity of an upper end on a downstream end of a primary jet nozzle 30 (first jet nozzle) and has a length which is shorter than a distance between the upper end on the downstream end of the primary jet nozzle and the upper end on the upstream end of the secondary jet nozzle.

Figure 4:
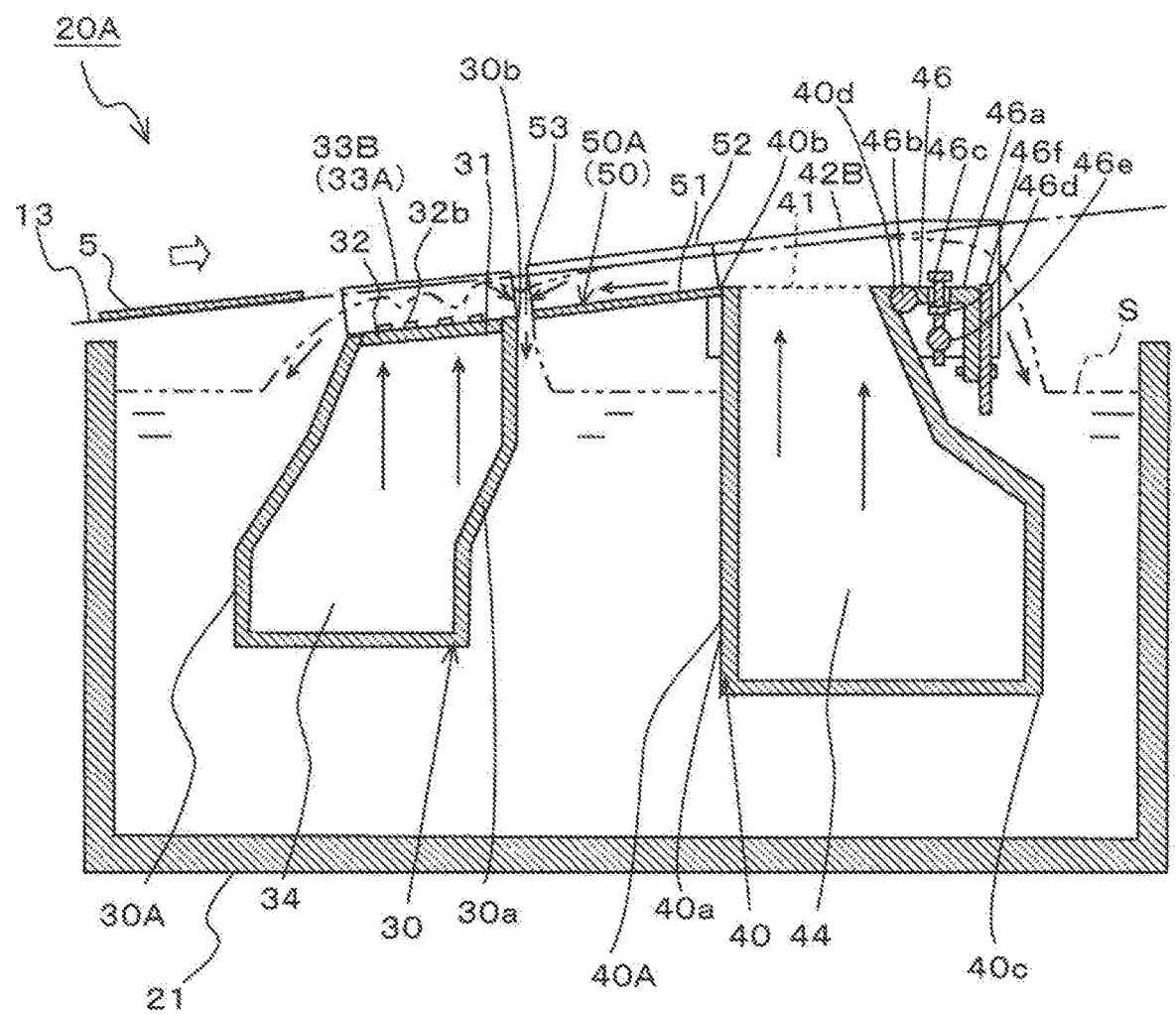
FIG. 4 is a schematic cross-sectional view showing a configuration example of a jet solder bath according to a first embodiment of the invention.

As shown in FIG. 4, the jet solder bath 20A is an example of the jet solder bath 20. The jet solder bath 20A includes a solder bath main body 21 which is a casing for containing the molten solder S. The solder bath main body 21 includes the primary jet nozzle 30, as the first jet nozzle, which is provided at an upper portion thereof, and the secondary jet nozzle 40, as the second jet nozzle, which is provided at a downstream side of the primary jet nozzle 30. The solder bath main body 21 contains a predetermined amount of the molten solder S by a predetermined depth, the solder being melted by a heater, not shown. A first pump (also referred to as "jet injection pump"), not shown, is provided through a duct, not shown, at a lower portion of the primary jet nozzle 30 and a second pump (also referred to as "jet injection pump"), not shown, is also provided through a duct, not shown, at a lower portion of the secondary jet nozzle 40.

The primary jet nozzle 30 includes a nozzle main body 30A which has upper and lower open ends and a jet injection opening 31 which is an upper open end of the nozzle main body 30A injects the molten solder S. The primary jet nozzle 30 is provided with a solder flow forming plate 32 that is used for injecting the molten solder S from the jet injection opening 31. The jet injection opening 31 is positioned above a liquid surface of the molten solder S. The solder flow forming plate 32 is a flat plate having an almost shape as the jet injection opening 31 and is provided with a plurality of jet injection holes 32b from which the molten solder S is stably injected to a desired height with strong energy. Side plates 33A and 33B are provided at sides of the jet injection opening 31 and project upward from the jet injection opening 31 so that they inhibit the molten solder S injected from the jet injection opening 31 from flowing down to a direction that is perpendicular to the carrying direction of the substrate 5.

Although, in this embodiment, any cylindrical protrusions are protruded from the solder flow forming plate 32 and the jet injection holes 32b are formed in the protrusions to have cylindrical shape, the jet injection holes 32b are not limited thereto; they may be perforated in the solder flow forming plate 32 or have any conventional shape other than the cylindrical shape. The nozzle main body 30A includes a cavity portion 34 having a rectangular bottom surface.

The secondary jet nozzle 40 includes a nozzle main body 40A which has upper and lower open ends and a jet injection opening 41 which is an upper open end of the nozzle main body 40A injects the molten solder S. The jet injection opening 41 is positioned above a liquid surface of the molten solder S. A bridge member 50A as an example of the bridge member 50 is provided between the primary and secondary jet nozzles 30 and 40. At upper end 40d on a downstream end 40c of the nozzle main body 40A, a downstream forming portion (rear former) 46 that forms a flow of the molten solder to change a jet injection width thereof is provided. The nozzle main body 40A includes a cavity portion 44 having a rectangular bottom surface.

Figure 5A:
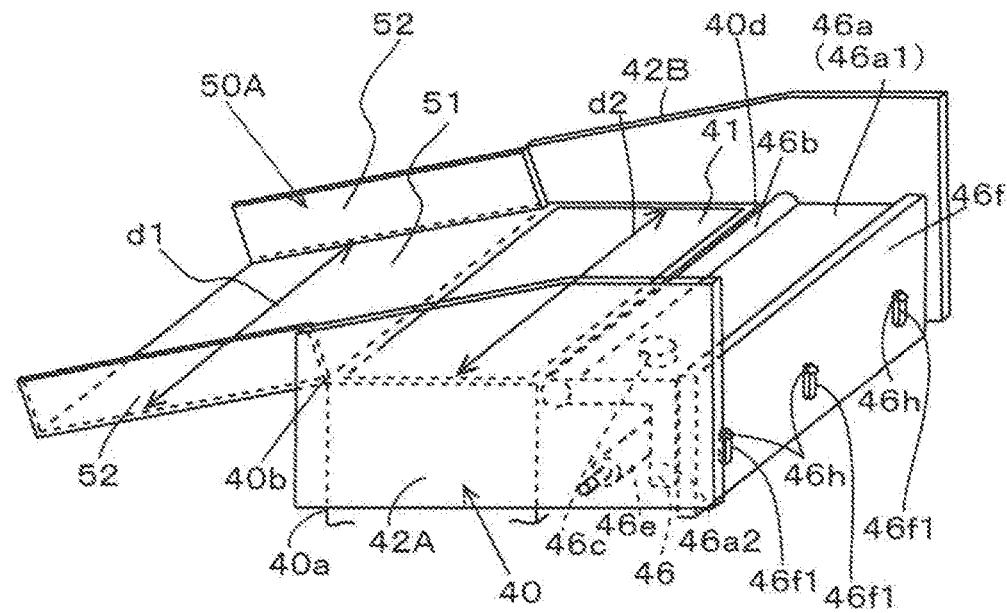
FIG. 5A is an important part enlarged perspective view showing a configuration example of a secondary jet nozzle in the first embodiment.
Figure 5B:
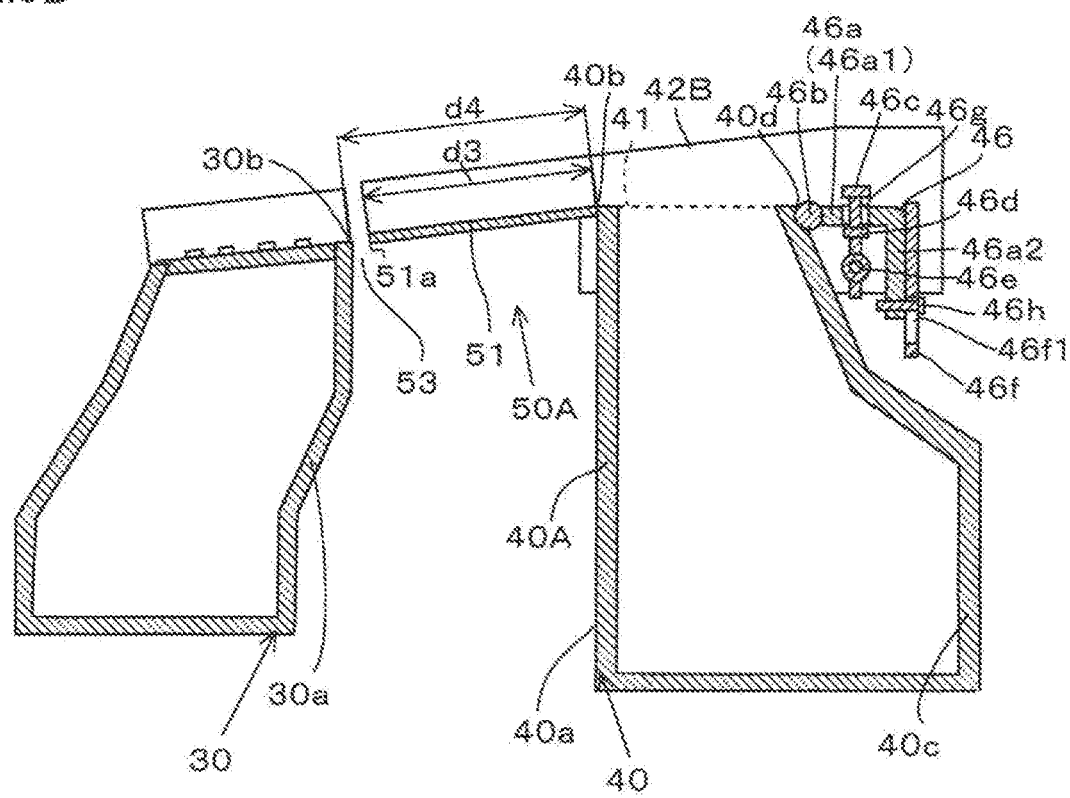
FIG. 5B is a cross-sectional view of a primary jet nozzle and the secondary jet nozzle in the first embodiment.

The jet injection opening 41 is positioned above a liquid surface of the molten solder S. As shown in FIGS. 5A and 5B, side plates 42A and 42B are provided at sides of the jet injection opening 41 and project upward from the jet injection opening 41 so that they inhibit the molten solder S injected from the jet injection opening 41 from flowing down to a direction that is perpendicular to the carrying direction of the substrate 5.

The bridge member 50A is connected to an upper end 40b on an upstream end 40a of the secondary jet nozzle 40 and extends toward the upper end 30b of the downstream end 30a of the primary jet nozzle 30. A guide portion 51 that guides a flow of the molten solder S on an upper surface of the bridge member 50 extends parallel to the transfer rails 13 toward the upper end 30b on the downstream end 30a of the primary jet nozzle 30. A slit 53 is formed between an upstream end 51a of the guide portion 51 and the upper end 30b of the primary jet nozzle 30.

A width d1 of the guide portion 51 crossing a conveying direction of the substrate 5 at right angle is the same as a width d2 of the jet injection opening 41 crossing a conveying direction of the substrate 5 at right angle. The guide portion 51 has side members 52, 52 which are arranged near the opposite ends thereof across a direction, which is perpendicular to the carrying direction of the substrate 5, and extend to a whole length of the guide portion 51 along the carrying direction of the substrate 5. The side members 52, 52 bend upward and inhibit the flow of the molten solder S flowing on the guide portion 51 from flowing down to a direction that is perpendicular to the carrying direction of the substrate 5, thereby making a surface of the molten solder S flowing on the guide portion 51 smooth.

Since the side plates 42A and 42B of the secondary jet nozzle 40 are continuously connected to the side members 52, 52 of the guide portion 51, the side members 52, 52 of the guide portion 51 and the side plates 42A and 42B of the secondary jet nozzle 40 control the molten solder S to inhibit the flow of the molten solder S from flowing down to a direction that is perpendicular to the carrying direction of the substrate 5.

The slit 53 is formed near the primary jet nozzle 30 to extend along the direction that is perpendicular to the carrying direction of the substrate 5. It is preferable that a length of the slit 53 from the upstream end to the downstream end is, for example, 5 mm or more and 7 mm or less, in order to prevent the molten solder S injected from the primary jet nozzle 30 and the molten solder S injected from the secondary jet nozzle 40 from being interfered with each other and prevent the molten solder S injected from the primary jet nozzle 30 and attached to the substrate 5 from being cooled and gotten solid. Therefore, it is preferable that a length d3 of the guide portion 51 along a flowing direction of the molten solder S guided in the guide portion 51 is shorter by 5 mm or more and 7 mm or less than a length d4 between the upper end 30b on the downstream end 30a of the primary jet nozzle 30 and the upper end 40b on the upstream end 40a of the secondary jet nozzle 40.

The downstream forming portion 46 includes a downstream forming plate 46a having an L-shape for forming a flow of the molten solder S injected from the jet injection opening 41 and flowing to the downstream side, a shaft 46b for rotating the downstream forming plate 46a to the nozzle main body 40A, a bolt 46c passing through the downstream forming plate 46a, a nut 46d which the bolt 46c screws, a set axis 46e which the bolt 46c screws, and a solder flow changing plate 46f which is attached at a downstream end of the downstream forming plate 46a.

The downstream forming plate 46a has a guide part 46a1 for guiding the flow of the molten solder S along the carrying direction of the substrate 5 and an attaching part 46a2 bending at a right angle from the downstream end of the guide part 46a1. The guide part 46a1 has a hole 46g vertically passing therethrough. A shank of the bolt 46c is inserted into the hole 46g. The nut 46d is set so that the hole 46g is put between a head of the bolt 46c and the nut 46d. Since a diameter of the hole 46g is set to be larger than a diameter of the shank of the bolt 46c but smaller than a width of the nut 46d, the shank of the bolt 46c can move within the hole 46g and the bolt 46c cannot be disengaged from the hole 46g. The attaching part 46a2 extends toward a side of the liquid surface of the molten solder S and has a treaded hole, not shown, to which a bolt to be attached to the solder flow changing plate 46f is screwed.

The shaft 46b is provided at the upstream end of the guide part 46a1 and extends to a direction that is perpendicular to the carrying direction of the substrate 5. The shaft 46b is rotatably attached at the upper end 40d on the downstream end 40c of the nozzle main body 40A. The shank of the bolt 46c further extends downward from the nut 46d and passes through the set axis 46e arranged at a lower position. The set axis 46e extends to a direction that is perpendicular to a direction of the shank of the bolt 46c and extends to a direction that is perpendicular to the carrying direction of the substrate 5. Opposite ends of the set axis 46e project from holes provided in the side plates 42A and 42B, and they is rotatably set to the side plates 42A and 42B.

The solder flow changing plate 46f has a vertical long slit 46f1. The solder flow changing plate 46f is attached to the attaching part 46a2 by a bolt 46h through the long slit 46f1 and the treaded hole of the downstream forming plate 46a. Accordingly, by changing an attached height of the bolt 46h to the attaching part 46a2 within the long slit 46f1, it is possible to vertically change a height of the solder flow changing plate 46f to the attaching part 46a2 of the downstream forming plate 46a.

[Operation Examples of Jet Soldering Apparatus 1 and Jet Solder Bath 20A]

The following will describe operation examples of the jet soldering apparatus 1 and the jet solder bath 20A. It is assumed that an operator performs various kinds of setting with a manipulating portion 71 and the control portion 70 controls an operation of every portion.

As shown in FIG. 2, when the operator mounts the substrate 5 on the transfer rails 13, the substrate 5 is carried on the transfer rails 13 to a void arrow direction shown in FIG. 2 and is transferred into the main body 10 from the carry-in port 11. When the substrate 5 reaches a position above the fluxer 15, the fluxer 15 applies the flux to desired positions of the substrate 5.

The substrate 5 to which the flux has been applied by the fluxer 15 is then carried to the preheater 16 on the transfer rails 13. The preheater 16 heats the substrate to a predetermined temperature.

The substrate 5 which has been heated to the predetermined temperature by the preheater 16 is then carried to the jet solder bath 20A on the transfer rails 13. The jet solder bath 20A performs the soldering on predetermined portions of the substrate 5. By driving the jet injection pumps, not shown, the molten solder S is injected from the primary and secondary jet nozzles 30, 40.

By driving the first jet injection pump, not shown, connected to the primary jet nozzle 30, the molten solder S enters into a cavity portion 34 through a duct, not shown, as shown by arrows in FIG. 4, and rises in the nozzle main body 30A. The molten solder S then is injected from the jet injection holes 32b of the solder flow forming plate 32 provided on the jet injection opening 31. The molten solder S injected from the jet injection opening 31 contacts the substrate 5 carried on the transfer rails 13 and is attached to the substrate 5. The molten solder S injected from the primary jet nozzle 30 is a roughly waved molten solder which allows the molten solder to enter to a portion into which the solder is difficult to enter such as a through-hole of the substrate 5 and/or sharp corners in an electronic component. The molten solder S injected from the jet injection opening 31 but not attached to the substrate 5 flows down to the upstream side of the nozzle main body 30A and from the slit 53 to return to the molten solder S accumulated in the solder bath main body 21.

By driving the second jet injection pump, not shown, connected to the secondary jet nozzle 40, the molten solder S enters into a cavity portion 44 through a duct, not shown, rises in the secondary jet nozzle 40 and is injected from the jet injection opening 41. The molten solder S injected from the jet injection opening 41 contacts the substrate 5 carried on the transfer rails 13 and is attached to the substrate 5 to solder the substrate 5. When any solder failure case occurs on the substrate 5 which the primary jet nozzle 30 has soldered, the smooth flow of the molten solder S from the secondary jet nozzle 40 mends this solder failure. The molten solder S flown to the upstream side of the jet injection opening 41 among the molten solder S injected from the jet injection opening 41 flows on the guide portion 51 to a side of the primary jet nozzle 30 in parallel with the carrying direction of the substrate 5 and flows down from the slit 53 to return to the molten solder S accumulated in the solder bath main body 21. Since the guide portion 51 is arranged parallel to the transfer rails 13 and there is no obstacle against the flow of the molten solder S on the guide portion 51, the molten solder S flowing on the guide portion 51 becomes a flat wave along the carrying direction of the substrate 5. Therefore, since it is possible to suppress reduction in the temperature of the substrate 5 carrying on the guide portion 51, the molten solder S attached to the substrate 5 by the primary jet nozzle 30 is neither cooled nor gotten solid, thereby allowing uniform soldering to be performed in the next secondary jet nozzle 40.

The molten solder S flown to the downstream side of the jet injection opening 41 among the molten solder S injected from the jet injection opening 41 but not attached to the substrate 5 passes on the downstream forming plate 46a to flow down from the downstream side of the solder flow changing plate 46f to return to the molten solder S accumulated in the solder bath main body 21.

As shown in FIG. 2, the soldered substrate 5 is carried on the transfer rails 13 to a position in the cooler 17. Cooling fans, not shown, of the cooler 17 cool the soldered substrate 5 for a predetermined period of time. After the substrate 5 is cooled, the substrate 5 is carried on the transfer rails 13 and is discharged from the carry-out port 12, and thus, the solder processing in the jet soldering apparatus 1 is completed.

Figure 6A:
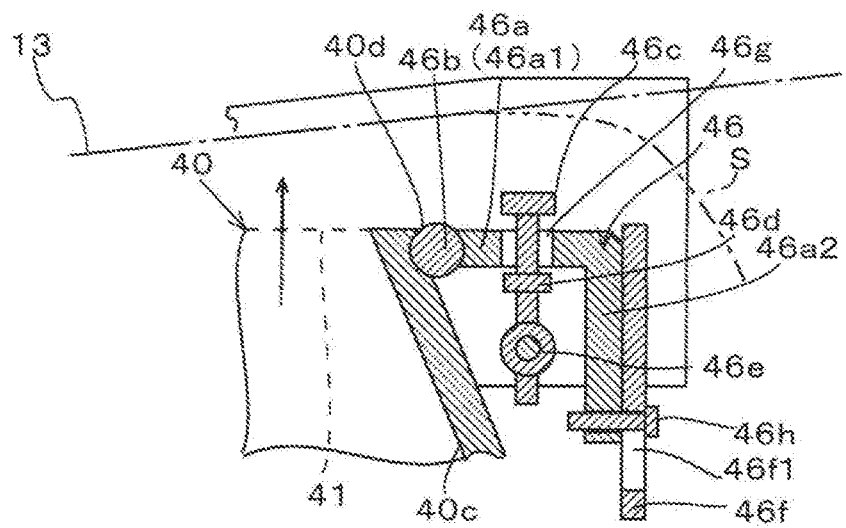
FIG. 6A is a cross-sectional view showing an operation example of a downstream-forming portion in the first embodiment.

The following will describe an operation of the downstream forming portion 46. FIG. 6A shows a case where an upper surface of the guide part 46a1 of the downstream forming plate 46a becomes parallel with the jet injection opening 41 and the bolt 46h is screwed at an uppermost position within the long slit 46f1 so that the solder flow changing plate 46f is attached to the attaching part 46a2 at a lowermost position thereof. In this condition, the molten solder S injected from the jet injection opening 41 to the transfer rails 13 positioned above the jet injection opening 41 and flown to the downstream side is guided on the guide part 46a1, is slightly pushed upward by the bolt 46c and flows down from the downstream end of the solder flow changing plate 46f.

Figure 6B:
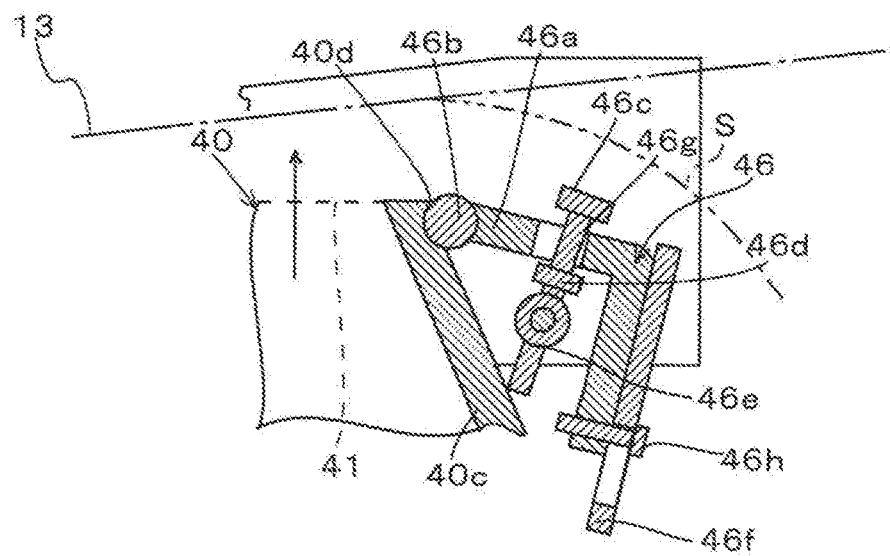
FIG. 6B is a cross-sectional view showing the operation example of the downstream-forming portion in the first embodiment.

When the operator rotates the head of the bolt 46c from this situation so that the head approaches the set axis 46e, the head of the bolt 46c presses the guide part 46a1 and the downstream forming plate 46a rotates around the shaft 46b together with the solder flow changing plate 46f. Accordingly, as shown in FIG. 6B, a lower end of the solder flow changing plate 46f approaches a downstream end of the nozzle main body 40A and the downstream forming portion 46 rotates away from the transfer rails 13. This invention is not limited to a case where the downstream forming portion 46 rotates from a situation shown in FIG. 6A to a situation shown in FIG. 6B; a case, not shown, where by rotating the head of the bolt 46c to separate from the set axis 46e, the downstream forming portion 46 rotates to approach the transfer rails 13 is conceivable.

Figure 6C:
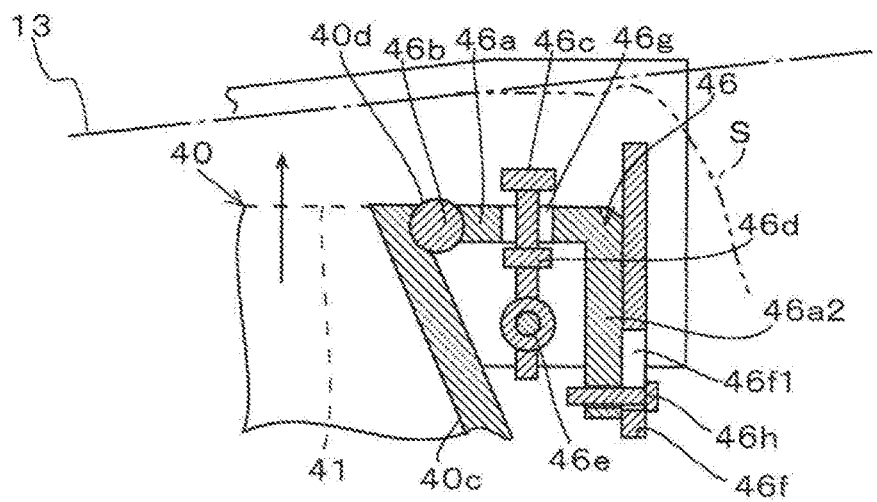
FIG. 6C is a cross-sectional view showing the operation example of the downstream-forming portion in the first embodiment.

When the bolt 46h is moved and screwed at the lowermost position in the long slit 46f1 from a situation shown in FIG. 6A, an attached height of the solder flow changing plate 46f to the attaching part 46a2 becomes highest, as shown in FIG. 6C. In this situation, the molten solder S injected upward from the jet injection opening 41 and guided on the guide part 46a1 slightly pushes up above the bolt 46c and then, rises again above the solder flow changing plate 46f. Of course, the attached height of the solder flow changing plate 46f to the attaching part 46a2 may be changed from a situation shown in FIG. 6B where the downstream forming plate 46a has rotated.

Thus, the downstream forming portion 46 rotates toward the nozzle main body 40A and the attached height of the solder flow changing plate 46f to the downstream forming plate 46a is changed, so that the molten solder S passing on the downstream forming plate 46a and the solder flow changing plate 46f can be changed in its shape and height. Therefore, the secondary jet nozzle 40 can change a contact amount of and contact time of the molten solder S injected to the substrate 5 depending on a size of the substrate and/or an electronic component mounted on the substrate.

In this embodiment, the bridge member 50A is provided between the primary and secondary jet nozzles 30 and 40 and the molten solder S injected from the jet injection opening 41 and flown to the upstream side of the secondary jet nozzle 40 is guided toward the primary jet nozzle 30 along the carrying direction of the substrate 5 and runs above the slit 53 together with the molten solder S injected from the primary jet nozzle 30 and flown to the downstream side of the primary jet nozzle 30. Accordingly, even after the molten solder S injected from the primary jet nozzle 30 is attached to the substrate 5, the substrate 5 carrying above the bridge member 50A also contacts the molten solder S. Thus, it is possible to inhibit the molten solder S injected from the primary jet nozzle 30 and attached to the substrate 5 from being cooled and gotten solid before it contacts the molten solder S from the secondary jet nozzle 40 and inhibit an oxide of the solder from riding on the waves of the molten solder S without bringing the primary and secondary jet nozzles closer to each other or combining the primary and secondary jet nozzles into a single unit. The bridge member 50A enables the molten solder S attached to the substrate 5 to be gotten solid while the molten solder S is sufficiently spread upward within the through-hole H of the substrate 5, as shown in FIG. 1A, thereby allowing good soldering to be performed. It is thus possible to perform the good soldering while maintaining respective actions of the molten solder S injected from the primary jet nozzle 30 and the molten solder S injected from the secondary jet nozzle 40.

[Configuration Example of Jet Solder Bath 20B as the Second Embodiment]

The following will describe a jet solder bath 20B as the second embodiment with reference to the respective figures wherein the bridge member extends from a vicinity of an upper end on an upstream end of a secondary jet nozzle (second jet nozzle) to a vicinity of an upper end on a downstream end of a primary jet nozzle (first jet nozzle) and has a length which is longer than a distance between the upper end on the downstream end of the primary jet nozzle and the upper end on the upstream end of the secondary jet nozzle as well as the bridge member is vertically changeable.

Figure 7:
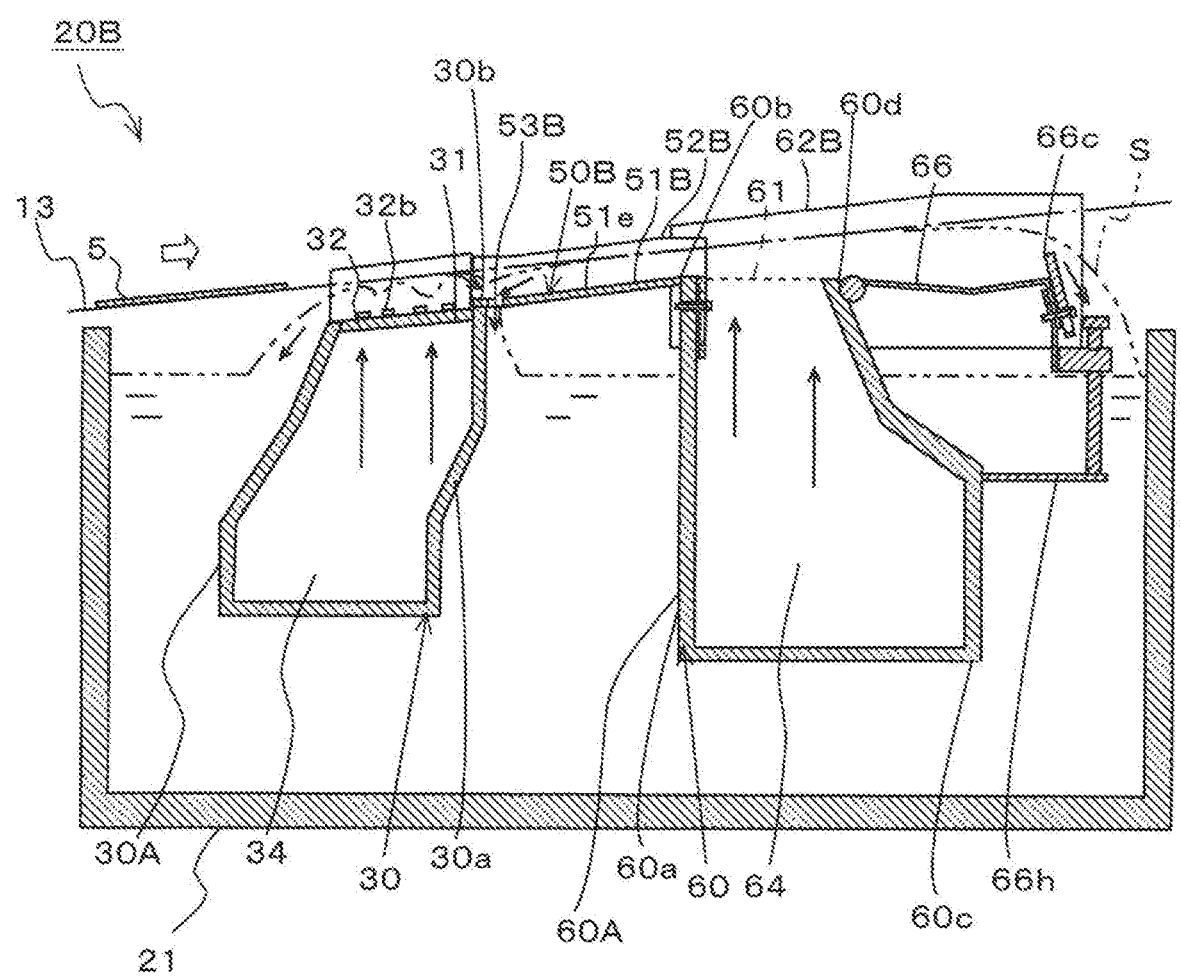
FIG. 7 is a schematic cross-sectional view showing a configuration example of a jet solder bath according to a second embodiment of the invention.

The jet solder bath 20B is an example of the jet solder bath 20 provided in the jet soldering apparatus 1 and is different from the jet solder bath 20A as the first embodiment in that, as shown in FIG. 7, it includes a bridge member 50B as a variable example of the bridge member 50A. In the jet solder bath 20B, like numbers are applied to like members of the jet solder bath 20A as the first embodiment and their detailed description will be omitted.

The jet solder bath 20B includes a solder bath main body 21 containing the molten solder S. The solder bath main body 21 includes the primary jet nozzle 30 which is provided at upper portion in the solder bath main body 21 and a secondary jet nozzle 60, as the second jet nozzle, which is provided at a downstream side of the primary jet nozzle 30. A first pump, not shown, is provided through a duct, not shown, at a lower portion of the primary jet nozzle 30 and a second pump, not shown, is also provided through a duct, not shown, at a lower portion of the secondary jet nozzle 60.

The primary jet nozzle 30 includes a nozzle main body 30A which has upper and lower open ends and a solder flow forming plate 32 that is provided with a plurality of jet injection holes 32b for injecting the molten solder S from the jet injection opening 31. The nozzle main body 30A includes a cavity portion 34 having a rectangular bottom surface.

The secondary jet nozzle 60 includes a nozzle main body 60A which has upper and lower open ends and a jet injection opening 61 which is an upper open end of the nozzle main body 60A injects the molten solder S. A bridge member 50B as an example of the bridge member 50 is provided between the primary and secondary jet nozzles 30 and 60. At upper end 60d on a downstream end 60c of the nozzle main body 60A, a downstream forming portion 66 that forms a flow of the molten solder to change a jet injection width thereof is provided. The nozzle main body 60A includes a cavity portion 64 having a rectangular bottom surface.

Figure 8A:
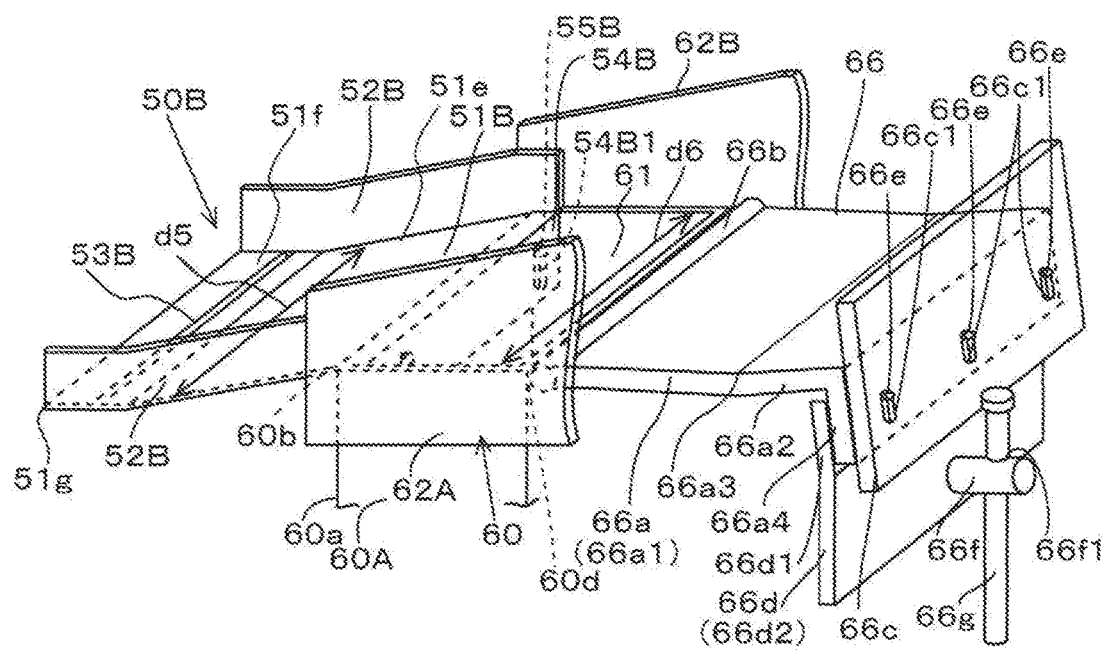
FIG. 8A is an important part enlarged perspective view showing a configuration of a secondary jet nozzle in the second embodiment.
Figure 8B:
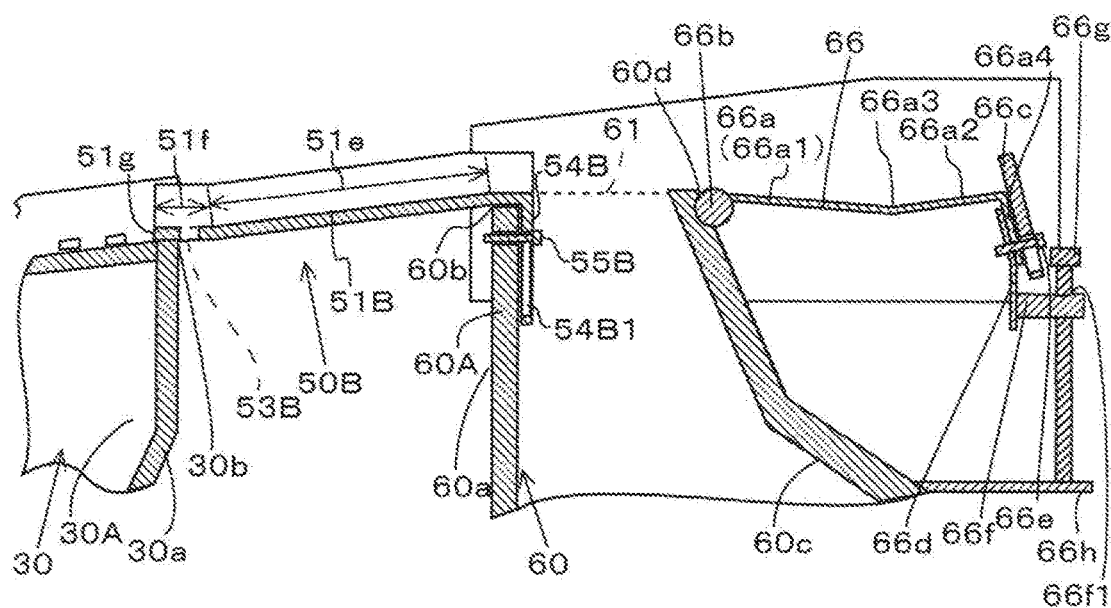
FIG. 8B is a cross-sectional view of a primary jet nozzle and the secondary jet nozzle in the second embodiment.

The jet injection opening 61 is positioned above a liquid surface of the molten solder S. As shown in FIGS. 8A and 8B, side plates 62A and 62B are provided at sides of the jet injection opening 61 and project upward from the jet injection opening 61 so that they inhibit the molten solder S injected from the jet injection opening 61 from flowing down to a direction that is perpendicular to the carrying direction of the substrate 5.

The bridge member 50B is proved at a vicinity of an upper end 60b on an upstream end 60a of the secondary jet nozzle 60 and extends toward the upper end 30b of the downstream end 30a of the primary jet nozzle 30. The bridge member 50B includes a guide portion 51B that guides a flow of the molten solder S injected from the jet injection opening 61 on an upper surface of the bridge member 50B, side members 52B, 52B arranged near opposite ends of the guide portion 51B across a direction which is perpendicular to the carrying direction of the substrate 5, a slit 53B which is formed near an upstream end of the guide portion 51B and an attaching portion 54B which bends at a downstream side of the guide portion 51B and is attached to the nozzle main body 60A.

The guide portion 51B is proved at a vicinity of the upper end 60b on the upstream end 60a of the secondary jet nozzle 60 and extends toward the upper end 30b on the downstream end 30a of the primary jet nozzle 30. The guide portion 51B includes an inclined part 51e that extends from the upper end 60b on the upstream end 60a of the secondary jet nozzle 60 and is inclined parallel to the transfer rails 13 and a bent part 51f that is bent from the upstream end of the inclined part 51e to extend parallel to the jet injection opening 31. A length of the guide portion 51B along a direction of the flow of the molten solder S guided on the guide portion 51 is set to be longer than a distance between the upper end 30b on the downstream end 30a of the primary jet nozzle 30 and the upper end 60b on the upstream end 60a of the secondary jet nozzle 60.

A width d5 of the guide portion 51B crossing a conveying direction of the substrate 5 at right angle is the same as a width d6 of jet injection opening 61 crossing a conveying direction of the substrate 5 at right angle. An upstream end 51g of the bent part 51f is mounted on a wall of the nozzle main body 30A at a downstream end 30a thereof and is screwed by a screw, not shown. The slit 53B is formed in the bent part 51f to extend widely along the direction that is perpendicular to the carrying direction of the substrate 5. The slit 53B is provided at the downstream side of the downstream end 30a of the primary jet nozzle 30.

The side members 52B, 52B bend upward and are provided on the whole length of the guide portion 51B along the carrying direction of the substrate 5. The side members 52B, 52B inhibit the flow of the molten solder S flowing on the guide portion 51B from flowing down to a direction that is perpendicular to the carrying direction of the substrate 5, thereby making a surface of the flow of the molten solder S flowing on the guide portion 51B smooth.

Since the side plates 62B and 62B of the secondary jet nozzle 60 are continuously connected to the side members 52B, 52B of the guide portion 51B, the side members 52B, 52B of the guide portion 51B and the side plates 62A and 62B of the secondary jet nozzle 60 control the molten solder S to inhibit the flow of the molten solder S from flowing down to a direction that is perpendicular to the carrying direction of the substrate 5.

It is preferable that a length of the slit 53B from the upstream end to the downstream end is, for example, 5 mm or more and 7 mm or less, in order to prevent the molten solder S injected from the primary jet nozzle 30 and the molten solder S injected from the secondary jet nozzle 60 from being interfered with each other and inhibit the molten solder S injected from the primary jet nozzle 30 and attached to the substrate 5 from being cooled and gotten solid. Although the slit 53B is formed on the whole length of the guide portion 51B along a direction that is perpendicular with the carrying direction of the substrate 5, the slit 53B is not limited to one formed on the whole length of guide portion 51B; the slit may be divided as plural slits along the direction that is perpendicular with the carrying direction of the substrate 5.

The attaching portion 54B has a vertically formed long slit 54B1. The attaching portion 54B is attached to a nozzle main body 60A at the upstream end 60a of the secondary jet nozzle 60 by a bolt 55B through the long slit 54B1 and a threaded hole in an upper portion of an upstream end 60a of the nozzle main body 60A. By changing the attached height of the bolt 55B to the nozzle main body 60A through the long slit 54B1, it is possible to vertically change the attached height of the bridge member 50B to the secondary jet nozzle 60.

The downstream forming portion 66 includes a downstream forming plate 66a for forming the molten solder S injected from the jet injection opening 61 and flowing to the downstream side, a shaft 66b for rotating the downstream forming plate 66a to the nozzle main body 60A, a solder flow changing plate 66c which is attached at a downstream end of the downstream forming plate 66a, a supporting plate 66d which is provided to put the downstream forming plate 66a between the solder flow changing plate 66c and the supporting plate 66d, a screw 66e which screws the solder flow changing plate 66c, the downstream forming plate 66a and the supporting plate 66d in this order, a projection portion 66f that projects from the supporting plate 66d, a bolt 66g passing through a threaded hole perforated in the projection portion 66f, and a supporting plate 66h which projects from the downstream end 60c of the nozzle main body 60A and supports a forward end of the shank of the bolt 66g.

The downstream forming plate 66a has a guide part 66a1 for guiding the flow of the molten solder S to the downstream side along the carrying direction of the substrate 5, a guide part 66a2 bent upward from a bent part 66a3 at the downstream end of the guide part 66a1, and an attaching part 66a4 bent downward at the downstream end of the guide part 66a2. The guide part 66a1 extends toward a lower side of the shaft 66b and guides the flow of the molten solder S downward. The guide part 66a2 guides the flow of the molten solder S upward.

A shaft 66b is provided at the upstream end of the guide part 66a1 and extends along a direction that is perpendicular with the carrying direction of the substrate 5. The shaft 66b is rotatably attached to the upper end 60d on the downstream end 60c of the nozzle main body 60A.

The solder flow changing plate 66c has vertically long slit 66c1. The solder flow changing plate 66c is screwed to the downstream forming plate 66a by the screw 66e through the long slit 66c1, the threaded hole formed in the attaching part 66a4 and the threaded hole formed in the supporting plate 66d. Therefore, by changing an attached height of the solder flow changing plate 66c to the downstream forming plate 66a and the supporting plate 66d by the screw 66e through the long slit 66c1, it is possible to vertically change the attached height of the solder flow changing plate 66c to the attaching part 66a4 of the downstream forming plate 66a.

The supporting plate 66d has an attaching part 66d1 having the threaded hole which the screw 66e screws and a supporting part 66d2 bent from the attaching part 66d1. The projection portion 66f projects from the supporting part 66d2 toward an opposite side of the nozzle main body 60A along a direction that is perpendicular with the supporting part 66d2. The projection portion 66f has a treaded hole 66f1 passing through along a direction that is perpendicular with the protection direction of the projection portion 66f from the supporting part 66d2.

A shank of the bolt 66g extends downward and is screwed into the threaded hole 66f1. The forward end of the shank of the bolt 66g contacts the supporting plate 66h and when the bolt 66g rotates so that the head of the bolt 66g approaches the projection portion 66f or separates from the projection portion 66f, the downstream forming plate 66a, the solder flow changing plate 66c, the supporting plate 66d and the projection portion 66f are rotated together around the shaft 66b because the height of the bolt 66g to the supporting plate 66h remains unchanged.

[Operation Example of Jet Solder Bath 20B]

The following will describe an operation example of the jet solder bath 20B. It is assumed that an operator performs various kinds of setting with a manipulating portion 71 and the control portion 70 controls an operation of every portion. The operation of the whole jet soldering apparatus 1 has been described in the first embodiment, which will be omitted.

By driving the first jet injection pump, not shown, connected to the primary jet nozzle 30, the molten solder S enters into a cavity portion 34 through a duct, not shown, as shown by arrows in FIG. 7, and rises in the nozzle main body 30A. The molten solder S is then injected from the jet injection holes 32b of the solder flow forming plate 32 provided on the jet injection opening 31. The molten solder S injected from the jet injection opening 31 contacts the substrate 5 carried on the transfer rails 13 and is attached to the substrate 5. The molten solder S injected from the jet injection opening 31 but not attached to the substrate 5 flows down to the upstream side of the nozzle main body 30A and from the slit 53 to return to the molten solder S accumulated in the solder bath main body 21.

By driving the second jet injection pump, not shown, connected to the secondary jet nozzle 60, the molten solder S enters into a cavity portion 44 through a duct, not shown, rises in the secondary jet nozzle 60 and is injected from the jet injection opening 61. The molten solder S injected from the jet injection opening 61 contacts the substrate 5 carried on the transfer rails 13 and is attached to the substrate 5 to solder the substrate 5. When any solder failure case occurs on the substrate 5 which the primary jet nozzle 30 has soldered, the calm flow of the molten solder S from the secondary jet nozzle 60 mends this solder failure. The molten solder S flown to the upstream side of the jet injection opening 61 among the molten solder S injected from the jet injection opening 61 flows on the guide portion 51B to a side of the primary jet nozzle 30 in parallel with the carrying direction of the substrate 5 and flows down from the slit 53 to return to the molten solder S accumulated in the solder bath main body 21. Since the guide portion 51B is arranged parallel to the transfer rails 13 and there is no obstacle against the flow of the molten solder S on the guide portion 51B, the molten solder S flowing on the guide portion 51B becomes a flat wave along the carrying direction of the substrate 5. Therefore, since it is possible to suppress reduction in the temperature of the substrate 5 carrying above the guide portion 51B, the molten solder S attached to the substrate 5 by the primary jet nozzle 30 is neither cooled nor gotten solid, thereby allowing uniform soldering to be performed in the next secondary jet nozzle 60.

The molten solder S flown to the downstream side of the jet injection opening 61 among the molten solder S injected from the jet injection opening 61 but not attached to the substrate 5 passes on the downstream forming portion 66 to flow down from the downstream side of the solder flow changing plate 66c to return to the molten solder S accumulated in the solder bath main body 21.

[Operation Example of Bridge Member 50B]

Figure 9A:
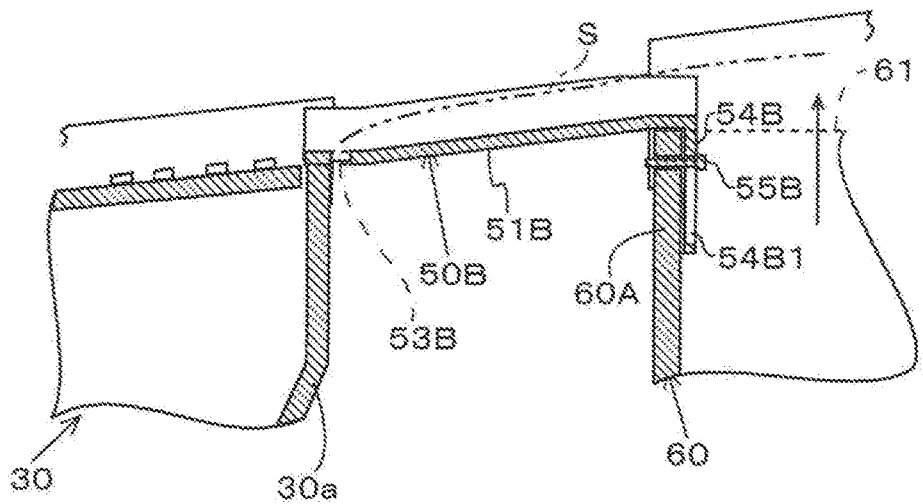
FIG. 9A is a cross-sectional view showing an operation example of a bridge member in the second embodiment.

The following will describe an operation of the bridge member 50B. FIG. 9A shows a situation where the bridge member 50B is attached to the nozzle main body 60A by the bolt 55B at a lowermost attaching position thereof while the bolt 55B is screwed at an uppermost position within the long slit 54B1.

Figure 9B:
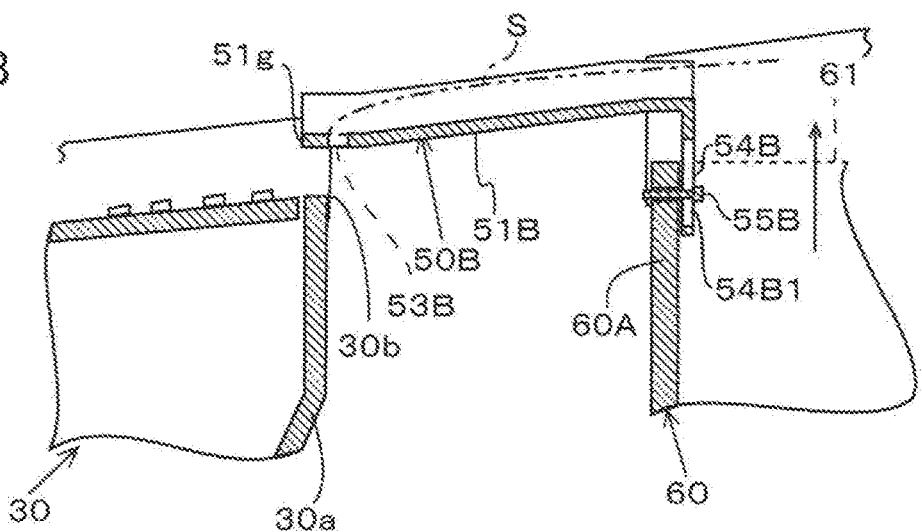
FIG. 9B is a cross-sectional view showing the operation example of the bridge member in the second embodiment.

When a screw, not shown, screwing the guide portion 51B to a wall of the primary jet nozzle 30 at a downstream end 30a thereof is disengaged from a situation shown in FIG. 9A and the bridge member 50B is moved upward so that the bolt 55B is screwed at a lower position within the long slit 54B1, as shown in FIG. 9B, the attached position of the bridge member 50B to the nozzle main body 60A becomes higher. In this moment, the upstream end 51g of the guide portion 51B separates upward from the upper end 30b of the primary jet nozzle 30. When the attached position of the bridge member 50B to the nozzle main body 60A becomes higher, a height of the molten solder S injected from the jet injection opening 61 and flowing on the guide portion 51B becomes higher than that of the molten solder S shown in FIG. 9A. Thus, by changing the attached position of the bridge member 50B to the nozzle main body 60A, it is possible to change an injection height of the molten solder S.

Figure 9C:
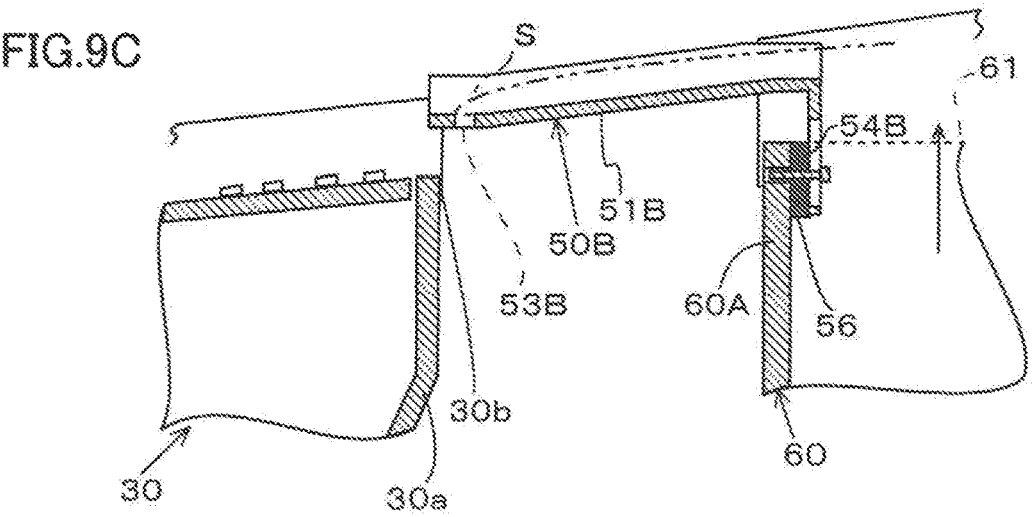
FIG. 9C is a cross-sectional view showing the operation example of the bridge member in the second embodiment.

In a situation shown in FIG. 9B, a plate member 56 may be put between an inner wall, at upstream side, of the nozzle main body 60A and the attaching portion 54B, as shown in FIG. 9C. The plate member 56 is put between them so that the jet injection opening 61 becomes narrower. This enables strength of the injected molten solder S to be enhanced without changing driving force of the pump. Since the bridge member 50B is moved to the downstream side by putting the plate member 56 between them, it is possible to change a shape of the molten solder S.

In this embodiment, the bridge member 50B is provided between the primary and secondary jet nozzles 30, 60 and the molten solder S injected from the jet injection opening 61 and flown to the upstream side of the secondary jet nozzle 60 is guided toward the primary jet nozzle 30 along the carrying direction of the substrate 5 and runs above the slit 53 together with the molten solder S injected from the primary jet nozzle 30 and flown to the downstream side of the primary jet nozzle 30. Accordingly, after the molten solder S injected from the primary jet nozzle 30 is attached to the substrate 5, the substrate 5 carrying above the bridge member 50B also contacts the molten solder S. Thus, it is possible to inhibit the molten solder S injected from the primary jet nozzle 30 and attached to the substrate 5 from being cooled and gotten solid before it contacts the molten solder S from the secondary jet nozzle 60 and inhibit an oxide of the solder from riding on the waves of the molten solder S without bringing the primary and secondary jet nozzles 30, 60 closer to each other or combining the primary and secondary jet nozzles 30, 60 into a single unit. The bridge member 50B enables the molten solder S attached to the substrate 5 to be gotten solid while the molten solder S is sufficiently spread upward within the through-hole H of the substrate 5, as shown in FIG. 1A, thereby allowing good soldering to be performed. It is thus possible to perform the good soldering while maintaining respective actions of the molten solder S injected from the primary jet nozzle 30 and the molten solder S injected from the secondary jet nozzle 60.

As shown in FIGS. 9A through 9C, since the attaching position or height of the bridge member 50B to the secondary jet nozzle 60 can be changed, it is possible to change the height of the molten solder S guided on the guide portion 51B. Therefore, it is possible to cope with various conditions such as setting conditions or injection conditions of the primary and secondary jet nozzles 30, 60.

Further, the bridge member 50B can be easily attached to a past secondary jet nozzle or disengaged therefrom by forming a treaded hole on an upstream side wall of the nozzle main body of the past secondary jet nozzle.

[Operation Example of Downstream Forming Portion 66]

Figure 10A:
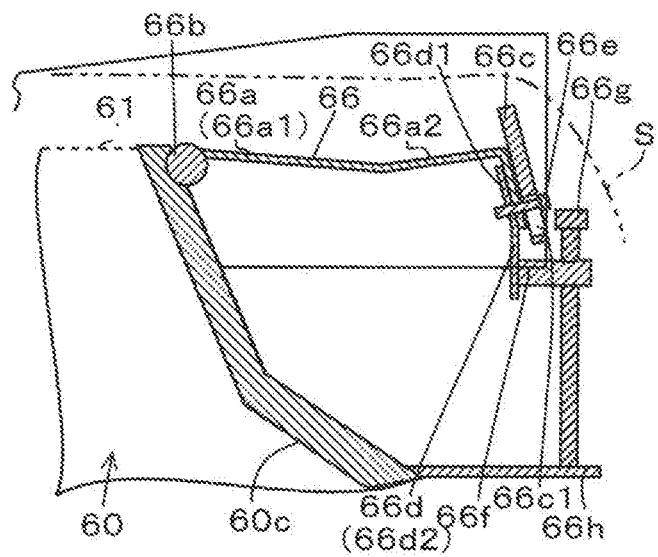
FIG. 10A is a cross-sectional view showing an operation example of a downstream-forming portion in the second embodiment.

The following will describe an operation of the downstream forming portion 66. FIG. 10A shows a situation where the solder flow changing plate 66c is attached to the downstream forming plate 66a at a lowermost attaching position thereof while the screw 66e is screwed at an uppermost position within the long slit 66c1. In this condition, the molten solder S injected from the jet injection opening 61 to the transfer rails 13 positioned above the jet injection opening 61 and flown to the downstream side is guided on the guide parts 66a1, 66a2, is slightly pushed upward by the bolt 46c and flows down from the downstream end of the solder flow changing plate 66c.

Figure 10B:
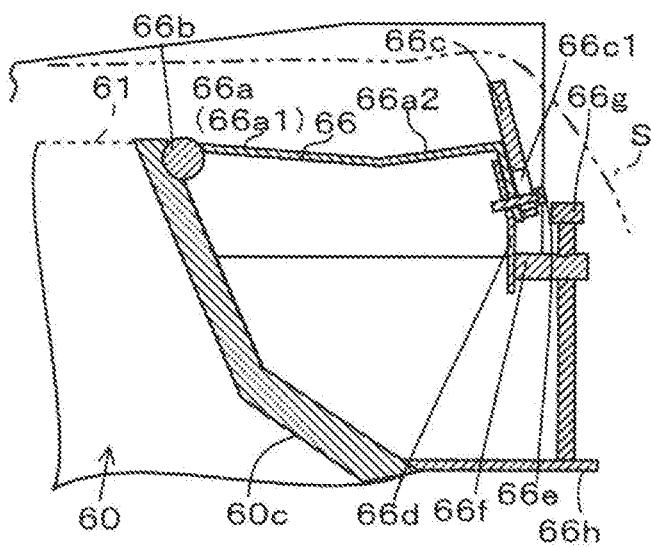
FIG. 10B is a cross-sectional view showing the operation example of the downstream-forming portion in the second embodiment.

When the screw 66e is moved and screwed at the lowermost position in the long slit 66c1 from this situation, an attached height of the solder flow changing plate 66c to the downstream forming plate 66a becomes highest, as shown in FIG. 10B. In this situation, the molten solder S injected upward from the jet injection opening 61 and guided on the guide parts 66a1, 66a2 is pushed up above the solder flow changing plate 66c more than the situation shown in FIG. 10A and then, is flown down from the downstream end of the solder flow changing plate 66c.

Figure 10C:
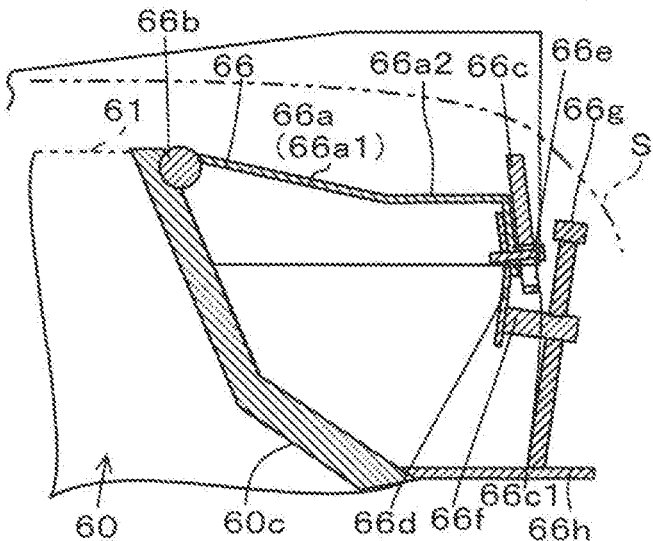
FIG. 10C is a cross-sectional view showing the operation example of the downstream-forming portion in the second embodiment.

When the operator rotates the head of the bolt 66g from the situation shown in FIG. 10A so that the head separates from the projection portion 66f, the projection portion 66f is moved downward on the shank of the bolt 66g so that the downstream forming plate 66a, the supporting plate 66d, the solder flow changing plate 66c and projection portion 66f rotates around the shaft 66b together. Accordingly, as shown in FIG. 10C, a lower end of the supporting plate 66d approaches a downstream end 60c of the nozzle main body 60A and the downstream forming portion 66 rotates away from the transfer rails 13. This invention is not limited to a case where the downstream forming portion 66 rotates from the situation shown in FIG. 10A to the situation shown in FIG. 10C; a case, not shown, where by rotating the head of the bolt 66g to separate from the projection portion 66f, the downstream forming portion 66 rotates to approach the transfer rails 13 is conceivable. Of course, the attached height of the solder flow changing plate 66c to the downstream forming plate 66a may be changed from a situation where the downstream forming portion 66 has rotated.

Thus, the downstream forming portion 66 rotates toward the nozzle main body 60A and the attached height of the solder flow changing plate 66c to the downstream forming plate 66a is changed, so that the molten solder S passing on the downstream forming plate 66a and the solder flow changing plate 66c can be changed in its shape and height. Therefore, the secondary jet nozzle 60 can change a contact amount of and contact time of the molten solder S injected to the substrate 5 depending on a size of the substrate and/or an electronic component mounted on the substrate.

Although the downstream forming plate 66a has been confirmed to be bent in this embodiment, this invention is not limited thereto. By being provided with the bent part 66a3, the molten solder S injected from the jet injection opening 61 flows from the guide part 66a1 toward the bent port 66a3 and then, flows to the guide part 66a2 after it stays in the bent part 66a3. Therefore, the downstream forming plate 66a is easier to guide the molten solder S to the downstream side than a flat downstream forming plate and is easy to adjust a point of the downstream forming plate in which the substrate 5 is separated from the molten solder S, namely, a so-called peel-back point because the molten solder S stays in the bent part 66a3.

[Configuration Example of Jet Solder Bath 20C as the Third Embodiment]

The following will describe a jet solder bath 20C as the third embodiment with reference to the respective figures wherein the bridge member is provided so as to be rotatable in the above-mentioned second embodiment. The jet solder bath 20C is an example of the jet solder bath 20 provided in the jet soldering apparatus 1 and is provided with a bridge member 50C what is a variable example of the bridge members 50A, 50B. In the jet solder bath 20C, like numbers are applied to like members of the jet solder baths 20A, 20B as the first and second embodiments and their detailed description will be omitted.

The jet solder bath 20C includes a solder bath main body 21 containing the molten solder S. The solder bath main body 21 includes the primary jet nozzle 30 which is provided at upper portion thereof and a secondary jet nozzle 80, as the second jet nozzle, which is provided at a downstream side of the primary jet nozzle 30. A first pump (also referred to as a "jet injection pump"), not shown, is provided through a duct, not shown, at a lower portion of the primary jet nozzle 30 and a second pump (also referred to as a "jet injection pump"), not shown, is also provided through a duct, not shown, at a lower portion of the secondary jet nozzle 60.

The primary jet nozzle 30 includes a nozzle main body 30A which has upper and lower open ends and a solder flow forming plate 32 that is provided with a plurality of jet injection holes 32b for injecting the molten solder S from the jet injection opening 31. The nozzle main body 30A includes a cavity portion 34 having a rectangular bottom surface.

The secondary jet nozzle 80 includes a nozzle main body 80A which has upper and lower open ends and a jet injection opening 81 which is an upper open end of the nozzle main body 80A injects the molten solder S. The jet injection opening 81 is positioned above a liquid surface of the molten solder S. A bridge member 50C as an example of the bridge member 50 is provided between the primary and secondary jet nozzles 30 and 80. At an upper end 80d on a downstream end 80c of the nozzle main body 80A, a downstream forming portion 86 that forms a flow of the molten solder to change a jet injection width thereof. The nozzle main body 80A includes a cavity portion 84 having a rectangular bottom surface.

Figure 12A:
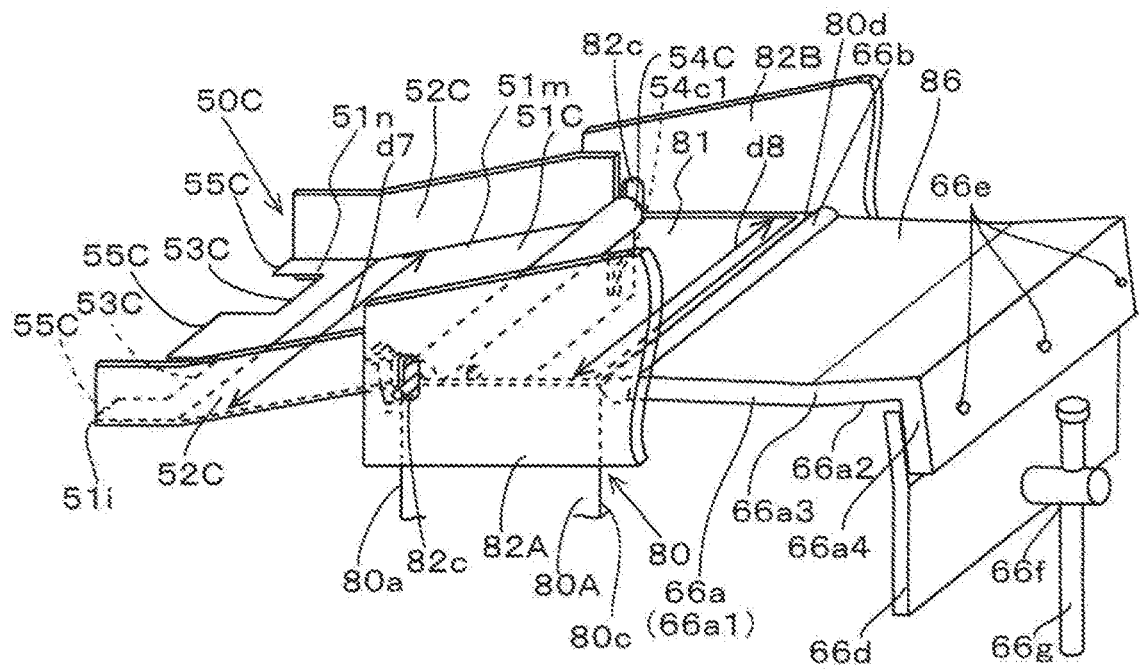
FIG. 12A is an important part enlarged perspective view showing a configuration of a secondary jet nozzle in the third embodiment.
Figure 12B:
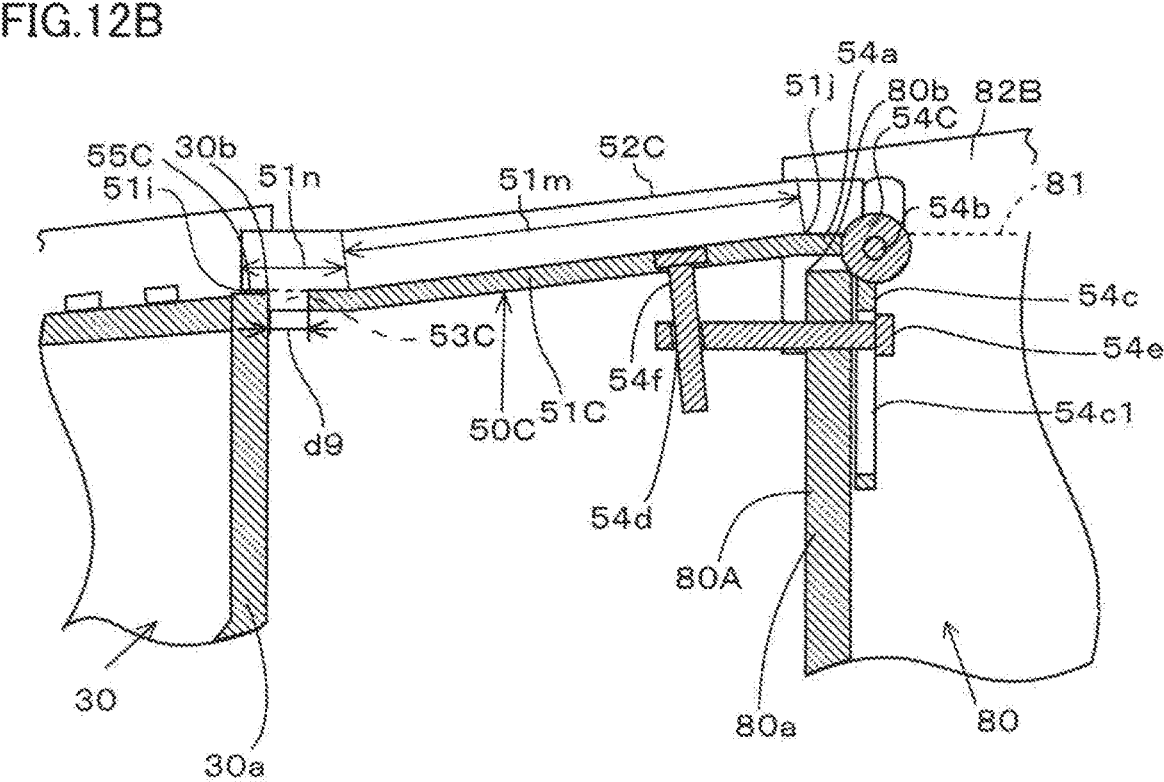
FIG. 12B is a cross-sectional view of a primary jet nozzle and the secondary jet nozzle in the third embodiment.

As shown in FIGS. 12A and 12B, side plates 82A and 82B are provided at sides of the jet injection opening 81. The side plates 82A and 82B respectively have vertically formed long openings 82c, 82c at their upper positions of the upstream side with the long openings 82c, 82c being mutually opposed. The side plates 82A and 82B project upward from the jet injection opening 81 so that they inhibit the molten solder S injected from the jet injection opening 81 from flowing down to a direction that is perpendicular to the carrying direction of the substrate 5.

The bridge member 50C includes a guide portion 51C that guides a flow of the molten solder S injected from the jet injection opening 81 on an upper surface of the bridge member 50C, side members 52C, 52C arranged near opposite ends of the guide portion 51C across a direction which is perpendicular to the carrying direction of the substrate 5, recessed portions 53C which are formed near an upstream end of the guide portion 51C and a rotation portion 54C which is provided at the downstream side of the guide portion 51C and rotates the bridge member 50C to the nozzle main body 80A.

The guide portion 51C is proved at a vicinity of the upper end 80b on the upstream end 80a of the secondary jet nozzle 80 and extends toward the upper end 30b on the downstream end 30a of the primary jet nozzle 30. A length of the guide portion 51C along a direction of the flow of the molten solder S guided on the guide portion 51C is set to be longer than a distance between the upper end 30b on the downstream end 30a of the primary jet nozzle 30 and the upper end 80b on the upstream end 80a of the secondary jet nozzle 80.

A width d7 of the guide portion 51C crossing a conveying direction of the substrate 5 at right angle is the same as a width d8 of jet injection opening 81 crossing a conveying direction of the substrate 5 at right angle. The guide portion 51C includes an inclined part 51m that extends from a point above the upper end 80b on the upstream end 80a of the secondary jet nozzle 80 and is inclined parallel to the transfer rails 13 and a bent part 51n that is bent from the upstream end of the inclined part 51m to extend parallel to the jet injection opening 31. Hook portions 55C are provided at the upstream end 51i of the bent part 51n. The hook portions 55C have thinner thickness compared by other portion of the bent part 51n and the hook portions are mounted on a wall of the primary jet nozzle 30 at the downstream end 30a and are screwed to the primary jet nozzle 30 by screws, not shown. The recessed portions 53C are formed in the bent part 51n so that they are long openings along the direction that is perpendicular to the carrying direction of the substrate 5 when the hook portions 55C are mounted on the primary jet nozzle 30.

The side members 52C, 52C bend upward and are provided over the whole length of the guide portion 51C along the carrying direction of the substrate 5. The side members 52B, 52B inhibit the flow of the molten solder S flowing on the guide portion 51C from flowing down to a direction that is perpendicular to the carrying direction of the substrate 5, thereby making a surface of the flow of the molten solder S flowing on the guide portion 51C smooth.

Since the side plates 82A and 82B of the secondary jet nozzle 80 are continuously connected to the side members 52C, 52C of the guide portion 51C, the side members 52C, 52C of the guide portion 51C and the side plates 82A and 82B of the secondary jet nozzle 80 control the molten solder S to inhibit the molten solder S from flowing down to a direction that is perpendicular to the carrying direction of the substrate 5.

It is preferable that a length d9 of the opening formed by the recessed portions 53C from the upstream end to the downstream end when the hook portions are screwed to the primary jet nozzle 30 is, for example, 5 mm or more and 7 mm or less, in order to prevent the molten solder S injected from the primary jet nozzle 30 and the molten solder S injected from the secondary jet nozzle 80 from being interfered with each other and prevent the molten solder S injected from the primary jet nozzle 30 and attached to the substrate 5 from being cooled and gotten solid. The recessed portions 53C form openings to which the molten solder S flown on the guide part 51C is flown down. Although the two recessed portions 53C are formed along a direction that is perpendicular with the carrying direction of the substrate 5 in this embodiment, the recessed portions 53C are not limited to two recess portions.

The rotation portion 54C includes an upstream forming part 54a which is bent from a downstream end 51j of the guide portion 51C, a shaft 54b for rotating the upstream forming part 54a to the nozzle main body 80A together with the guide portion 51C, an attaching part 54c which extends from the shaft 54b to a direction that is perpendicular to the upstream forming part 54a and is attached to the nozzle main body 80A, a bolt 54e which is screwed to the attaching part 54c and has a shank including a threaded hole 54d, and a bolt 54f which is screwed to the treaded hole 54d.

The upstream forming part 54a forms the molten solder S which is injected from the jet injection opening 81 and flows to the upstream side to guide the molten solder S to the guide portion 51C. The upstream forming part 54a is provided above the upstream end 80a of the nozzle main body 80A and is arranged slightly upward away from the upper end 80b so that the upstream forming part 54a is able to rotate around the shaft 54b.

The shaft 54b is provided above the upstream end 80a of the nozzle main body 80A and extends along a direction that is perpendicular with the carrying direction of the substrate 5. The opposite ends of the shaft 54b are respectively inserted into the long openings 82c, 82c formed in the side plates 81A and 82B and the shaft 54b is rotatable and vertically movable in the side plates 82A and 82B.

The attaching part 54c has a vertically formed long slit 54c1. In the rotation portion 54C, the attaching part 54c is attached to the secondary jet nozzle 80 by the bolt 54e through the long slit 54c1 and a hole in a wall of the upstream end 80a of the nozzle main body 80A. By changing the attached height of the bolt 54e within the long slit 54c1, it is possible to vertically change the attached height of the attaching portion 54c to the secondary jet nozzle 80.

The head of the bolt 54f is embedded in the guide portion 51C, thereby not preventing the flow of the molten solder S from flowing on the guide portion 51C.

Figure 11:
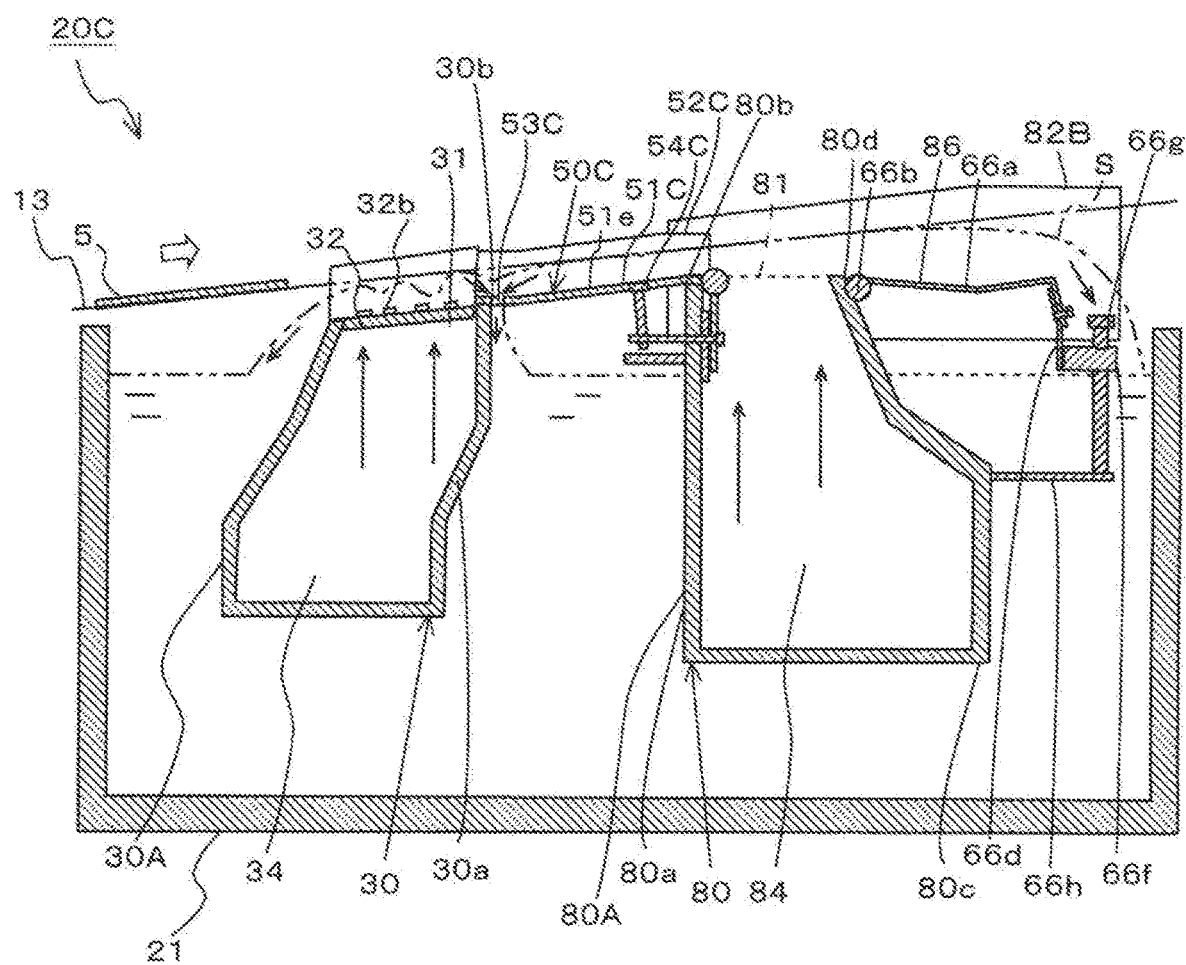
FIG. 11 is a schematic cross-sectional view showing a configuration example of a jet solder bath according to a third embodiment of the invention.

As shown in FIGS. 11 and 12A, the downstream forming portion 86 is configured so that the solder flow changing plate 66c is deleted from the downstream forming portion 66 described in the second embodiment. The downstream forming portion 86 includes a downstream forming plate 66a for forming the molten solder S injected from the jet injection opening 81 and flowing to the downstream side, the shaft 66b for rotating the downstream forming plate 66a to the nozzle main body 80A, a supporting plate 66d which is provided at a side of the nozzle main body 80A from the downstream forming plate 66a, screws 66e which screw the downstream forming plate 66a and the supporting plate 66d, a projection portion 66f that projects from the supporting plate 66d, a bolt 66g passing through a threaded hole perforated in the projection portion 66f, and a supporting plate 66h which projects from the downstream end 80c of the nozzle main body 80A and supports a forward end of the shank of the bolt 66g.

The downstream forming plate 66a has a guide part 66a1 for guiding the flow of the molten solder S to the downstream side along the carrying direction of the substrate 5, a guide part 66a2 bent upward from a bent part 66a3 at the downstream end of the guide part 66a1, and an attaching part 66a4 bent downward at the downstream end of the guide part 66a2.

A forward end of the shank of the bolt 66g contacts the supporting plate 66h and when the bolt 66g rotates so that the head of the bolt 66g approaches the projection portion 66f or separates from the projection portion 66f, the downstream forming plate 66a, the supporting plate 66d and the projection portion 66f are rotated together around the shaft 66b because the height of the bolt 66g to the supporting plate 66h remains unchanged.

[Operation Example of Jet Solder Bath 20C]

The following will describe an operation example of the jet solder bath 20C. It is assumed that an operator performs various kinds of setting with a manipulating portion 71 and the control portion 70 controls an operation of every portion. The operation of the whole jet soldering apparatus 1 has been described in the first embodiment, which will be omitted.

By driving the first jet injection pump, not shown, connected to the primary jet nozzle 30, the molten solder S enters into a cavity portion 34 through a duct, not shown, as shown by arrows in FIG. 11, and rises in the nozzle main body 30A. The molten solder S is then injected from the jet injection holes 32b of the solder flow forming plate 32 provided on the jet injection opening 31. The molten solder S injected from the jet injection opening 31 contacts the substrate 5 carried on the transfer rails 13 and is attached to the substrate 5, thereby soldering the substrate 5. The molten solder S injected from the jet injection opening 31 but not attached to the substrate 5 flows down to the upstream side of the nozzle main body 30A and from the openings formed by the recessed portions 53C to return to the molten solder S accumulated in the solder bath main body 21.

By driving the second jet injection pump, not shown, connected to the secondary jet nozzle 80, the molten solder S enters into a cavity portion 44 through a duct, not shown, rises in the secondary jet nozzle 60 and is injected from the jet injection opening 81. The molten solder S injected from the jet injection opening 61 contacts the substrate 5 carried on the transfer rails 13 and is attached to the substrate 5 to solder the substrate 5. When any solder failure case occurs on the substrate 5 which the primary jet nozzle 30 has soldered, the calm flow of the molten solder S from the secondary jet nozzle 60 mends this solder failure. The molten solder S flown to the upstream side of the jet injection opening 81 among the molten solder S injected from the jet injection opening 81 is guided from the upstream forming part 54a to the guide portion 51C, flows on the guide portion 51C to a side of the primary jet nozzle 30 in parallel with the carrying direction of the substrate 5 and flows down from the openings formed by the recessed portions 53C to return to the molten solder S accumulated in the solder bath main body 21. Since there is no obstacle against the flow of the molten solder S on the upstream forming part 54a and the guide portion 51C, the molten solder S flowing on the guide portion 51C becomes a flat wave along the carrying direction of the substrate 5. Therefore, since it is possible to suppress reduction in the temperature of the substrate 5 carrying above the guide portion 51C by arranging the guide portion 51C to be in parallel with the transfer rails 13, the molten solder S attached to the substrate 5 by the primary jet nozzle 30 is neither cooled nor gotten solid, thereby allowing uniform soldering to be performed in the next secondary jet nozzle 80.

The molten solder S flown to the downstream side of the jet injection opening 81 among the molten solder S injected from the jet injection opening 81 but not attached to the substrate 5 passes on the downstream forming portion 86 to flow down from the downstream side thereof to return to the molten solder S accumulated in the solder bath main body 21. The rotation of the downstream forming portion 86 is the same as that of the downstream forming portion 66, which has been already described, and the rotation of the downstream forming portion 86 will be omitted. Since the downstream forming portion 86 is rotatable to the nozzle main body 80A, it is possible to change the shape and height of molten solder S passing on the downstream forming plate 66a and the solder flow changing plate 66c. Therefore, the secondary jet nozzle 80 can change a contact amount of and contact time of the molten solder S injected to the substrate 5 depending on a size of the substrate and/or an electronic component mounted on the substrate.

[Operation Example of Bridge Member 50C]

Figure 13A:
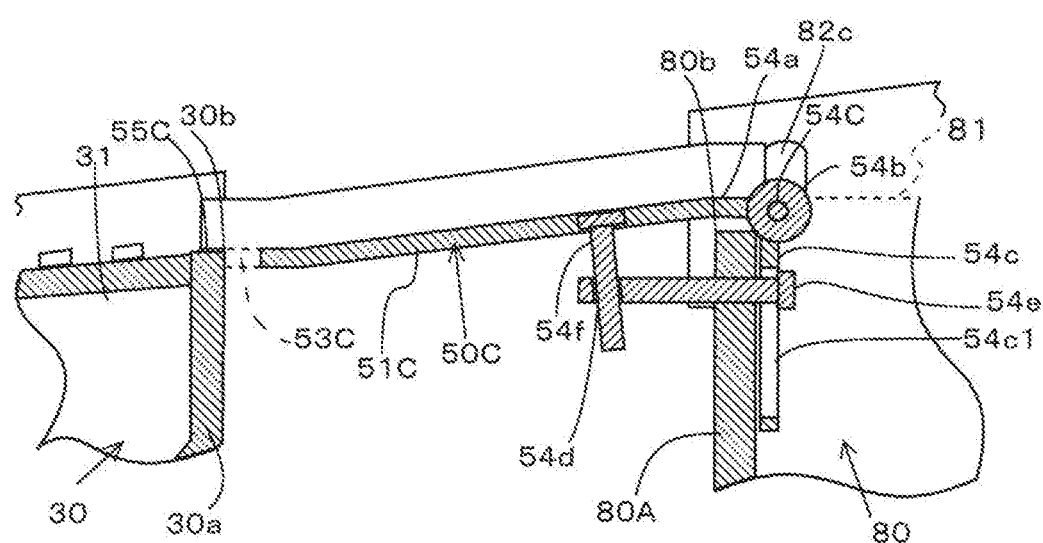
FIG. 13A is a cross-sectional view showing an operation example of a bridge member in the third embodiment.

The following will describe an operation of the bridge member 50C. FIG. 13A shows a situation where the bridge member 50C is attached to the nozzle main body 80A by the bolt 54e at a lowermost attaching position thereof while the bolt 54e is stopped at an uppermost position within the long slit 54c1. In this situation, the guide portion 51C is positioned parallel to the transfer rails 13.

Figure 13B:
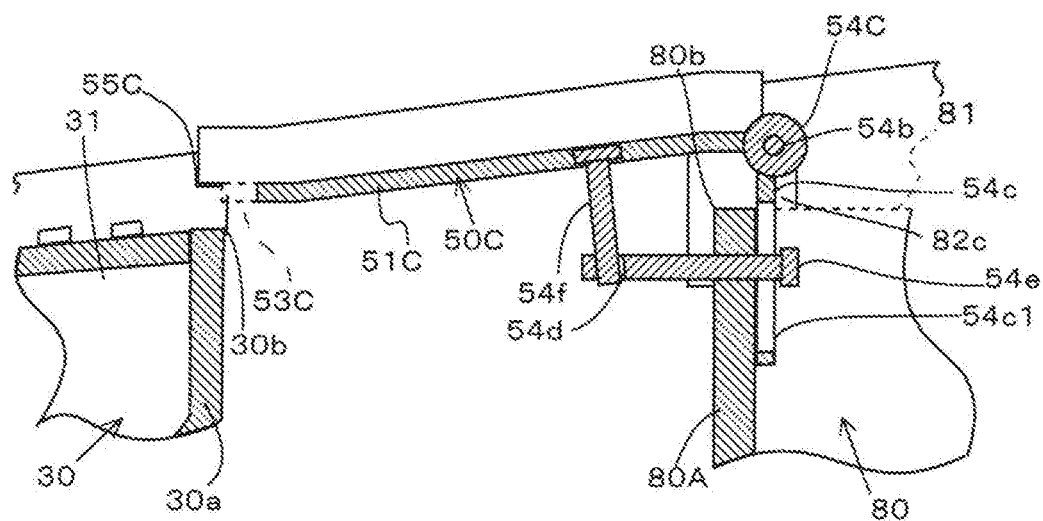
FIG. 13B is a cross-sectional view showing the operation example of the bridge member in the third embodiment.

When a screw, not shown, screwed to the hook portions 55C is disengaged from the situation shown in FIG. 13A and a screwed position of the bolt 54f to the treaded hole 54d is changed to a lower position, the bolt 54e is shifted toward the carrying direction of substrate 5 because the bolt 54f extends so that it is inclined. At the same time, the bolt 54e is moved to a lower position within the long slit 54c1, the attached position of the bridge member 50C to the nozzle main body 80A becomes higher, as shown in FIG. 13B. Thus, by elevating the attached position of the bridge member 50C to the nozzle main body 80A, it is possible to elevate an injection height of the molten solder S. On the contrary, by lowering the attached position of the bridge member 50C to the nozzle main body 80A, it is possible to lower an injection height of the molten solder S, which is not shown.

Figure 14A:
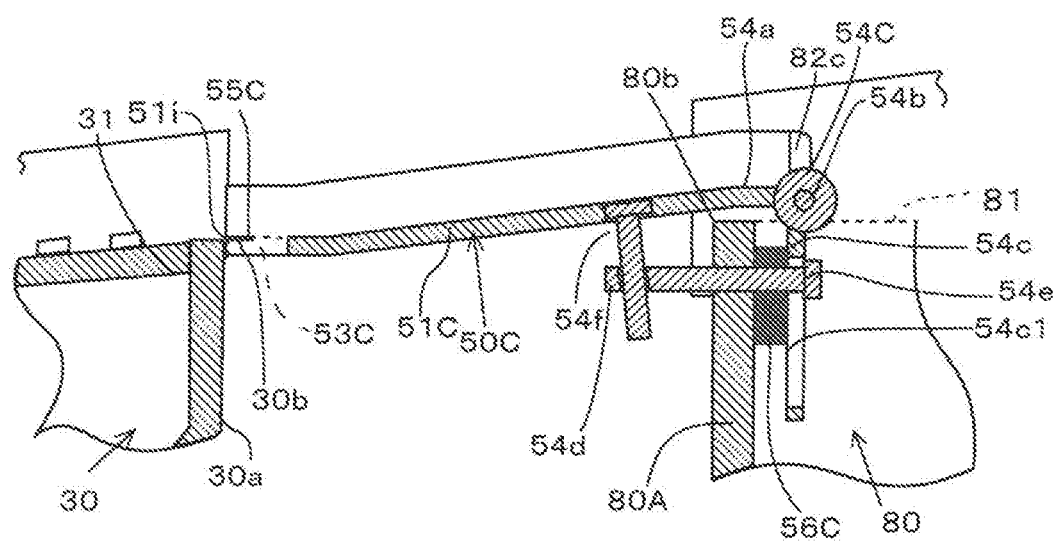
FIG. 14A is a cross-sectional view showing the operation example of a bridge member in the third embodiment.
Figure 14B:
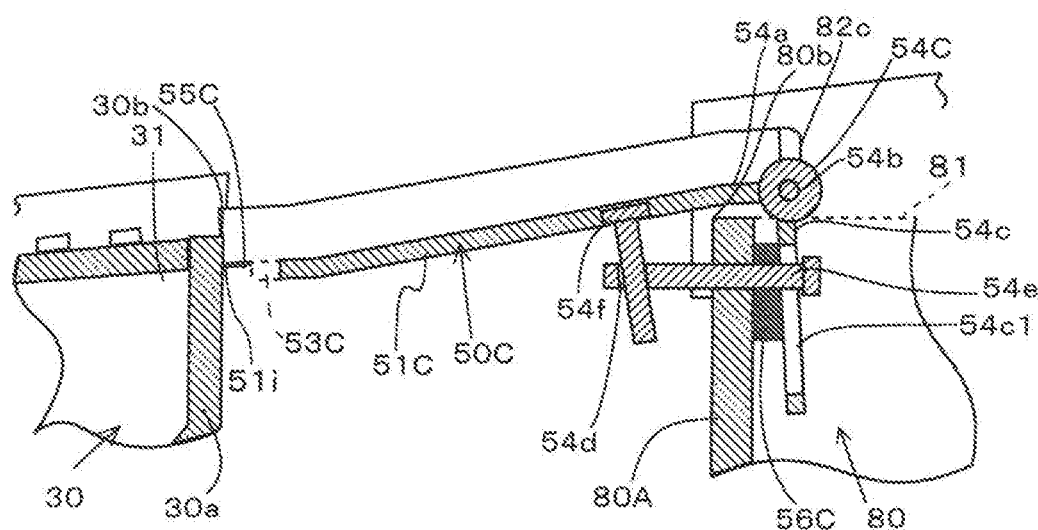
FIG. 14B is a cross-sectional view showing the operation example of the bridge member in the third embodiment.

In a situation shown in FIG. 13A, when a screw, not shown, screwed to the hook portions 55C is disengaged and the bolt 54e is shifted, a buffer member 56C may be put between an inner wall, at upstream side, of the nozzle main body 80A and the attaching part 54c, as shown in FIG. 14A. The buffer member 56C is put between them so that the jet injection opening 81 becomes narrower. This enables strength of the injected molten solder S to be enhanced without changing driving force of the pump. Since the bridge member 50C is moved to the downstream side by putting the buffer member 56C between them so that the openings formed by the recessed portions 53C is enlarged, it is possible to change a shape of the molten solder S along the carrying direction of the substrate 5. It is preferable that the thickness of the buffer member 56C is almost equal to or less than the length of the hook portion 55C from the upstream end 51i thereof to the downstream end thereof. It is preferable that when the buffer member 56C is put between the nozzle main body 80A and the attaching part 54c, the upstream end 51i of the hook portion 55C contacts the upper end 30b of the downstream end 30a on the primary jet nozzle 30 or is mounted on the upper end 30b.

In a situation shown in FIG. 13A, when the bolt 54f rotates so that the bolt 54e approaches the head of the bolt 54f, the hook portions 55C rotate downward away from the transfer rails 13 around the shaft 54b. On the contrary, when the bolt 54f rotates so that the bolt 54e separates from the head of the bolt 54f, the hook portions 55C rotate upward to approach the transfer rails 13 around the shaft 54b, which is not shown.

Thus, the attaching position, height or angle of the bridge member 50C to the secondary jet nozzle 80 can be changed. Accordingly, it is possible to change the height and shape of the molten solder S passing on the bride member 50C. Therefore, the secondary jet nozzle 80 can change a contact amount of and contact time of the molten solder S injected from the jet injection opening 81 to the substrate 5. In this embodiment, since the bridge member 50C and the downstream forming portion 66 are provided, the height of the flowing molten solder S can be changed in both of the upstream and downstream sides of the jet injection opening 81. Therefore, it is possible to cope with various conditions such as setting conditions or injection conditions of the primary and secondary jet nozzles 30, 80.

In this embodiment, the bridge member 50C is provided between the primary and secondary jet nozzles 30 and 80 and the molten solder S injected from the jet injection opening 81 and flown to the upstream side of the secondary jet nozzle 80 is guided toward the primary jet nozzle 30 on the upstream forming part 54a and the guide portion 51C and runs above the recessed portions 53C together with the molten solder S injected from the primary jet nozzle 30 and flown to the downstream side of the primary jet nozzle 30. Accordingly, after the molten solder S injected from the primary jet nozzle 30 is attached to the substrate 5, the substrate 5 carrying above the bridge member 50C also contacts the molten solder S. Thus, it is possible to inhibit the molten solder S injected from the primary jet nozzle 30 and attached to the substrate 5 from being cooled and gotten solid before it contacts the molten solder S from the secondary jet nozzle 80 and inhibit an oxide of the solder from riding on the waves of the molten solder S without bringing the primary and secondary jet nozzles 30, 80 closer to each other or combining the primary and secondary jet nozzles 30, 80 into a single unit. The bridge member 50C enables the molten solder S attached to the substrate 5 to be gotten solid while the molten solder S is sufficiently spread upward within the through-hole H of the substrate 5, as shown in FIG. 1A, thereby allowing good soldering to be performed. It is thus possible to perform the good soldering while maintaining respective actions of the molten solder S injected from the primary jet nozzle 30 and the molten solder S injected from the secondary jet nozzle 80.

The bridge member 50C can be easily attached to a past secondary jet nozzle or disengaged therefrom by forming a treaded hole on the wall of the nozzle main body of the past secondary jet nozzle at the upstream side.

In the above-mentioned embodiments, by providing with the slit 53, the slit 53B and the recessed portions 53C, even when the molten solder S injected from their secondary jet nozzles and flown on the guide portions 51, 51B and 51C and the molten solder S injected from the primary jet nozzle 30 run together, the molten solder S flows down from the slit 53, the slit 53B and the recessed portions 53C. Therefore, the substrate 5 receives no influence when the molten solder S injected from the respective jet nozzles runs together. It is also possible to restrain over flow in which the molten solder S elevates over the substrate 5.

Although, in the above-mentioned embodiments, the side members have been provided on the guide portions and have been formed over the lengthwise of the guide portions along the carrying direction of the substrate 5, this invention is not limited thereto. A part of the side member is cut away at a vicinity of the upstream side of the guide portion and the molten solder S may be flown down from the cut part of the side member to the molten solder S accumulated in the solder bath main body 21. When a cut part having the same function as those of the slit 53, the slit 53B and the recessed portions 53C is provided in the side member, the slit 53, the slit 53B and the recessed portions 53C may be deleted.

Although the cases wherein the bridge member extends from a vicinity of an upper end on an upstream end of the secondary jet nozzle (second jet nozzle) to a vicinity of an upper end of a downstream end of the primary jet nozzle (first jet nozzle) have been described in the above-mentioned embodiments, this invention is not limited thereto; the bridge member may be configured to have any slit, recessed portion and the like at the upper end on the downstream end of the primary jet nozzle to return the molten solder S to a side of the jet solder bath, in order to guide the molten solder S injected from the secondary jet nozzle and flown to the upstream side of the secondary jet nozzle to the downstream side of the primary jet nozzle and prevent the molten solder S injected from the secondary jet nozzle and the molten solder S injected from the primary jet nozzle from being interfered with each other.

The bridge member may be configured so that the bridge member extends from a vicinity of an upper end on a downstream end of the primary jet nozzle (first jet nozzle) to a vicinity of an upper end on an upstream end of the secondary jet nozzle (second jet nozzle) and the bridge member is changeable in its height and rotatable. In this case, the bridge member may be configured to guide the molten solder injected from the primary jet nozzle and flown to the downstream side of the primary jet nozzle to the side of the secondary jet nozzle. Further, in this case, the bridge member may have the above-mentioned slit 53B or the recessed portions 53C at a vicinity of the upper end on the downstream end of the primary jet nozzle. Additionally, when a cut part having the same function as those of the slit 53, the slit 53B and the recessed portions 53C is provided in the side member, the slit 53, the slit 53B and the recessed portions 53C may be deleted.

Although the downstream forming portions 46, 66 and 86 have been provided in the secondary jet nozzles, the configuration of each of the downstream forming portions 46, 66 and 86 is not limited to the above-mentioned ones. The downstream forming portions 46, 66 and 86 may be deleted. They may be jointed to the upper end on the downstream end of the secondary jet nozzle like the bridge member 50A. They may be vertically moved by having the same configuration as that of the bridge member 50B. They may be further rotated or moved by having the same configuration as that of the bridge member 50C.

Although the cases wherein the substrate 5 has a through-hole H and the molten solder S wetly spreads within the through-hole H sufficiently have been described in the above-mentioned embodiments, this invention is not limited thereto; according to this invention, it is possible to perform any good soldering on the substrate having no through-hole.

The terms and expressions which have been employed in the foregoing description are used therein as terms of description and not of limitation, and these are no intention, in the use of such terms and expressions, of excluding equivalent of the features shown and described or portions thereof, it being recognized that the scope of the invention is defined and limited only by the claims.

It is to be noted that any technical scope of the claims and/or meaning of term (s) claimed in the claims are not limited to the description in the above-mentioned embodiments. It should be understood by those skilled in the art that various modifications, combinations, sub-combinations and alterations may occur depending on design requirements and other factors insofar as they are within the scope of the appended claims or the equivalents thereof.

What is claimed is:
1. A jet solder bath comprising:
a first jet nozzle which injects molten solder by a first pump;
a second jet nozzle which injects the molten solder by a second pump, the second jet nozzle being arranged on a downstream side of the first jet nozzle along a carrying direction of a substrate;
a bridge member arranged between the first and second jet nozzles, wherein the bridge member includes:
a guide portion having a length extending along the carrying direction of the substrate and a width extending in a direction perpendicular to the carrying direction of the substrate, wherein the guide portion guides molten solder flowing along the length of the guide portion of at least one of flows of the molten solder injected from the first jet nozzle and flowing to the downstream side of the first jet nozzle and of the molten solder injected from the second jet nozzle and flowing to an upstream side of the second jet nozzle, and
side members which controls the flow of the molten solder, the side members being arranged on opposite sides of the guide portion across the width of the guide portion and extending along the length of the guide portion; and an attaching portion which attaches the bridge member to an upper end of at least one of the first jet nozzle and the second jet nozzle.

2. The jet solder bath according to claim 1, wherein the bridge member extends from an upper end on an upstream end of the second jet nozzle to an upper end on a downstream end of the first jet nozzle.

3. The jet solder bath according to claim 2, wherein the attaching portion attaches the bridge member to the second jet nozzle to change an attachment height of the bridge member from the second jet nozzle.

4. The jet solder bath according to claim 2, further comprising a rotation portion which rotates the bridge member to the second jet nozzle.

5. The jet solder bath according to claim 3, further comprising a rotation portion which rotates the bridge member to the second jet nozzle.

6. The jet solder bath according to claim 1, wherein the bridge member extends from an upper end on a downstream end of the first jet nozzle to an upper end on an upstream end of the second jet nozzle.

7. The jet solder bath according to claim 6, wherein the attaching portion attaches the bridge member to the first jet nozzle to change an attachment height of the bridge member from the first jet nozzle.

8. The jet solder bath according to claim 6, further comprising a rotation portion which rotates the bridge member to the first jet nozzle.

9. The jet solder bath according to claim 7, further comprising a rotation portion which rotates the bridge member to the first jet nozzle.

10. The jet solder bath according to claim 1 wherein the length of the guide portion is equal to or longer than a distance between the downstream end of the first jet nozzle and the upstream end of the second jet nozzle, and
the guide portion contains an opening formed near the first jet nozzle along a direction that is perpendicular to the carrying direction of the substrate.

11. The jet solder bath according to claim 1 wherein the length of the guide portion is shorter than a distance between the downstream end of the first jet nozzle and the upstream end of the second jet nozzle.

12. A jet soldering apparatus comprising:
a preheater which previously heats a substrate;
a jet solder bath according to claim 1;
a cooler which cools the substrate soldered in the jet solder bath; and
a control portion which controls operations of the preheater, the jet solder bath and the cooler.

13. A jet soldering apparatus comprising:
a fluxer which applies a flux to a substrate;
a preheater which previously heats the substrate to which the flux is applied;
a jet solder bath according to claim 1;
a cooler which cools the substrate soldered in the jet solder bath; and
a control portion which controls operations of the fluxer, the preheater, the jet solder bath and the cooler.

* * * * *